United States Patent
Tomari et al.

(10) Patent No.: US 12,535,488 B2
(45) Date of Patent: Jan. 27, 2026

(54) SCREENING METHOD FOR CLIENT PROTEIN-PROTECTING PROTEIN, AND PHYSIOLOGICALLY ACTIVE PROTEIN-STABILIZING PROTEIN AND PHARMACEUTICAL COMPOSITION COMPRISING SAID PROTEIN

(71) Applicant: The University of Tokyo, Tokyo (JP)

(72) Inventors: Yukihide Tomari, Tokyo (JP); Shintaro Iwasaki, Tokyo (JP); Kotaro Tsuboyama, Tokyo (JP); Masaaki Oyama, Tokyo (JP); Hiroko Hata, Tokyo (JP); Hiro-oki Iwakawa, Tokyo (JP); Eriko Matsuura, Tokyo (JP)

(73) Assignee: The University of Tokyo, Tokyo (JP)

( * ) Notice: Subject to any disclaimer, the term of this patent is extended or adjusted under 35 U.S.C. 154(b) by 1238 days.

(21) Appl. No.: 17/277,943

(22) PCT Filed: Jun. 20, 2019

(86) PCT No.: PCT/JP2019/024515
§ 371 (c)(1),
(2) Date: May 27, 2021

(87) PCT Pub. No.: WO2020/059228
PCT Pub. Date: Mar. 26, 2020

(65) Prior Publication Data
US 2021/0349102 A1 Nov. 11, 2021

Related U.S. Application Data

(60) Provisional application No. 62/734,329, filed on Sep. 21, 2018.

(51) Int. Cl.
G01N 33/68 (2006.01)
G01N 33/15 (2006.01)
G16B 30/10 (2019.01)

(52) U.S. Cl.
CPC ......... *G01N 33/6839* (2013.01); *G01N 33/15* (2013.01); *G16B 30/10* (2019.02); *G01N 2333/43573* (2013.01); *G01N 2333/4703* (2013.01)

(58) Field of Classification Search
None
See application file for complete search history.

(56) References Cited

FOREIGN PATENT DOCUMENTS

JP 200642731 A 2/2006
WO WO-2015125501 A1 * 8/2015 ........... A01N 1/0221

OTHER PUBLICATIONS

Breydo, Leonid, Jessica W. Wu, and Vladimir N. Uversky. "α-Synuclein misfolding and Parkinson's disease." Biochimica et Biophysica Acta (BBA)—Molecular Basis of Disease 1822.2 (2012): 261-285.*
Aprile, Francesco A., Pietro Sormanni, and Michele Vendruscolo. "A rational design strategy for the selective activity enhancement of a molecular chaperone toward a target substrate." Biochemistry 54.32 (2015): 5103-5112.*
Altschul et al., "Basic Local Alignment Search Tool", J. Mol. Biol., 1990, vol. 215, p. 403-410.
Boothby et al., "Tardigrades Use Intrinsically Disordered Proteins to Survive Desiccation", Molecular Cell, 2017, vol. 65, p. 975-984.
Chang et al., "Hsc70 is required for endocytosis and clathrin function in *Drosophila*", The Journal of Cell Biology, Nov. 11, 2002, vol. 159:3, p. 477-487.
Dietzl et al., "A genome-wide transgenic RNAi library for conditional gene inactivation in *Drosophila*", Nature, 2007, vol. 448, p. 151-157.
Dosztanyi et al., "IUPred: web server for the prediction of intrinsically unstructured regions of proteins based on estimated energy content", Bioinformatics, 2005, vol. 21:16, p. 3433-3434.
Dosztanyi, et al., "The pairwise energy content estimated from amino acid composition discriminates between folded and intrinsically unstructured proteins" J. Mol. Biol. 347, 827-839 (2005).
Elden et al., "Ataxin-2 intermediate-length polyglutamine expansions are associated with increased risk for ALS", Nature, 2010, vol. 466:7310, p. 1069-1075.
Galea et al., "Large-scale Analysis of Thermo-stable, Mammalian Proteins Provides Insights into the Intrinsically Disordered Proteome", J Proteome Res., 2009, vol. 8:1, p. 211-226.
Guo et al., "Nuclear-Import Receptors Reverse Aberrant Phase Transitions of RNA-Binding Proteins with Prion-like Domains", Cell, 2018, vol. 173, p. 677-692.
Hagedorn et al., "*Drosophila melanogaster* auxilin regulates the internalization of Delta to control activity of the Notch signaling pathway", The Journal of Cell Biology, 2006, vol. 173:3, p. 443-452.
Iwasaki et al., "Defining funamental steps in the assembly of the Drosophia RNAi enzyme complex", Nature, 2015, vol. 521, p. 533-549.
Jovicic et al., "Modifiers of C9orf72 DPR toxicity implicate nucleocytoplasmic transport impairments in c9FTD/ALS", Nat Neurosci., 2015, vol. 18:9, p. 1226-1229.
Kaken, "Search Research Projects 2016 Fiscal Year Research Status Report", 2018.

(Continued)

*Primary Examiner* — G. Steven Vanni
(74) *Attorney, Agent, or Firm* — The Webb Law Firm

(57) ABSTRACT

Provided herein is a novel screening method for a client protein-protecting protein, and a physiologically active protein-stabilizing protein and a pharmaceutical composition using the protein. Also provided herein is a method for screening for a client protein-protecting protein, including the step of evaluating stability of a client protein in the presence of a protein having an intrinsically disordered structure. Also provided herein is an agent for stabilizing a physiologically active protein comprising, as an active ingredient, a protein having any one of amino acid sequences of SEQ ID NOs: 1 to 6; and a pharmaceutical composition including the protein and a physiologically active protein.

14 Claims, 15 Drawing Sheets

Specification includes a Sequence Listing.

(56) References Cited

OTHER PUBLICATIONS

Kim et al., "Thermal Behavior of Proteins: Heat-Resistant Proteins and Their Heat-Induced Secondary Structural Changes", Biochemistry, 2000, vol. 39, p. 14839-14846.
Krobitsch et al., "Aggregation of huntingtin in yeast varies with the length of the polyglutamine expansion and the expression of chaperone proteins", PNAS, 2000, vol. 97:4, p. 1589-1594.
Kumar et al., "Molecular Chaperone Hsp70 and Its Constitutively Active Form Hsc70 Play an Indispensable Role During Eye Development of Prosophila melanogaster", Mol Neurobiol, 2017, p. 1-17.
Layton et al., "Large-scale, quantitative protein assays on a high-throughput DNA sequencing chip", Mol Call, 2019, vol. 73:5, p. 1075-1082.
Liu et al., "Intrinsically Disordered Proteins as Important Players during Desiccation Stress of Soybean Radicles", Journal of Proteome Research, 2017, vol. 16, p. 2393-2409.
Mori et al., "The C9orf72 GGGGCC Repeat Is Translated into Aggregating Dipeptide-Repeat Proteins in FTLD/ALS", Sciencexpress, 2013, vol. 330, p. 1-7.
Neumann et al., "Ubiquitinated TDP-43 in Frontotemporal Lobar Degeneration and Amyotrophic Lateral Sclerosis", Science, 2006, vol. 314, p. 130-133.
Nonaka et al., "Truncation and pathogenic mutations facilitate the formation of intracellular aggregates of TDP-43", Human Molecular Genetics, 2009, vol. 18:18, p. 3353-3364.
Panganiban et al., "Random heteropolymers preserve protein function in foreign environments", Science, 2018, vol. 359, p. 1239-1243.
Pearson, "Rapid and Sensitive Sequence Comparison with FASTP and FASTA", Methods in Enzymology, 1990, vol. 183, p. 63-98.
Tsuboyama et al., "Conformational Activation of Argonaute by Distinct yet Coordinated Actions of the Hsp70 and Hsp90 Chaperone Systems", Molecular Cell, 2018, vol. 70, p. 722-729.
Tsuboyama et al., "Functional analysis of heat-resistant proteins", Conference program of the Japanese Biochemical Society, Sep. 3, 2018.
Tsvetkov et al., "Thermo-resistant intrinsically disordered proteins are efficient 20S proteasome substrates", Mol. BioSyst, 2012, vol. 8, p. 368-373.
Uhlen et al., "Tissue-based map of the human proteome", Science, 2015, vol. 347:6220, p. 1-12.
Warrick et al., "Expanded Polyglutamine Protein Forms Nuclear Inclusions and Causes Neural Degeneration in *Drosophila*", Cell, 1998, vol. 93, p. 939-949.
Waterman, "Computer Analysis of Nucleic Acid Sequences", Methods in Enzymology, 1988, vol. 164, p. 756-793.
Wilbur et al., "Rapid similarity searches of nucleic acid and protein data banks", Proc. Natl. Acad. Sci. USA, 1983, vol. 80, p. 726-730.
Zhang et al., "Exploring intrinsically disordered proteins in Chlamydomonas reinhardtii", Scientific Reports, 2018, vol. 8:6805, p. 1-11.
Ahn et al., "Chaperone-like activities of alpha-synuclein: alpha-synuclein assists enzyme activities of esterases", Biochemical and Biophysical Research Communications, 2006, pp. 1142-1149, vol. 346.
Chakrabortee et al., "Catalytic and chaperone-like functions in an intristically disordered protein associated with desiccation tolerance", PNAS, 2010, pp. 16084-16089, vol. 107, No. 37.
Liu et al., "Both plant and animal LEA proteins act as kinetic stabilisers of polyglutamine-dependent protein aggregation", FEBS Letters, 2011, pp. 630-634, vol. 585.
Popova et al., "The intristically disordered protein LEA7 from *Arabidopsis thaliana* protects the isolated enzyme lactate dehydrogenase and enzymes in a soluble leaf proteome during freezing and drying", Biochemica et Biophysica Acta, 2015, pp. 1517-1525, vol. 1854.
Yuen et al., "Preferential adsorption to air-water interfaces: a novel cryoprotective mechanism for LEA proteins", Biochemical Journal, 2019, pp. 1121-1135, vol. 476.

* cited by examiner

A

B

```
                              SEQUENCE LISTING

<160> NUMBER OF SEQ ID NOS: 40

<210> SEQ ID NO 1
<211> LENGTH: 59
<212> TYPE: PRT
<213> ORGANISM: Homo sapiens

<400> SEQUENCE: 1

Met Thr Arg Gly Asn Gln Arg Glu Leu Ala Arg Gln Lys Asn Met Lys
1               5                   10                  15

Lys Gln Ser Asp Ser Val Lys Gly Lys Arg Arg Asp Asp Gly Leu Ser
            20                  25                  30

Ala Ala Ala Arg Lys Gln Arg Asp Ser Glu Ile Met Gln Gln Lys Gln
        35                  40                  45

Lys Lys Ala Asn Glu Lys Lys Glu Glu Pro Lys
    50                  55

<210> SEQ ID NO 2
<211> LENGTH: 83
<212> TYPE: PRT
<213> ORGANISM: Homo sapiens

<400> SEQUENCE: 2

Met Ser Gly Pro Asn Gly Asp Leu Gly Met Pro Val Glu Ala Gly Ala
1               5                   10                  15

Glu Gly Glu Glu Asp Gly Phe Gly Glu Ala Glu Tyr Ala Ala Ile Asn
            20                  25                  30

Ser Met Leu Asp Gln Ile Asn Ser Cys Leu Asp His Leu Glu Glu Lys
        35                  40                  45

Asn Asp His Leu His Ala Arg Leu Gln Glu Leu Leu Glu Ser Asn Arg
    50                  55                  60

Gln Thr Arg Leu Glu Phe Gln Gln Gln Leu Gly Glu Ala Pro Ser Asp
65                  70                  75                  80

Ala Ser Pro

<210> SEQ ID NO 3
<211> LENGTH: 99
<212> TYPE: PRT
<213> ORGANISM: Homo sapiens

<400> SEQUENCE: 3

Met Ala Gln Gly Gln Arg Lys Phe Gln Ala His Lys Pro Ala Lys Ser
1               5                   10                  15

Lys Thr Ala Ala Ala Ala Ser Glu Lys Asn Arg Gly Pro Arg Lys Gly
            20                  25                  30

Gly Arg Val Ile Ala Pro Lys Lys Ala Arg Val Val Gln Gln Gln Lys
        35                  40                  45

Leu Lys Lys Asn Leu Glu Val Gly Ile Arg Lys Lys Ile Glu His Asp
    50                  55                  60

Val Val Met Lys Ala Ser Ser Leu Pro Lys Lys Leu Ala Leu Leu
65                  70                  75                  80

Lys Ala Pro Ala Lys Lys Gly Ala Ala Ala Thr Ser Ser Lys
            85                  90                  95

Thr Pro Ser
```

<210> SEQ ID NO 4
<211> LENGTH: 111
<212> TYPE: PRT
<213> ORGANISM: Homo sapiens

<400> SEQUENCE: 4

```
Met Ala Asn Ile His Gln Glu Asn Glu Glu Met Glu Gln Pro Met Gln
1               5                   10                  15

Asn Gly Glu Glu Asp Arg Pro Leu Gly Gly Glu Gly His Gln Pro
            20                  25                  30

Ala Gly Asn Arg Arg Gly Gln Ala Arg Arg Leu Ala Pro Asn Phe Arg
        35                  40                  45

Trp Ala Ile Pro Asn Arg Gln Ile Asn Asp Gly Met Gly Gly Asp Gly
    50                  55                  60

Asp Asp Met Glu Ile Phe Met Glu Glu Met Arg Glu Ile Arg Arg Lys
65                  70                  75                  80

Leu Arg Glu Leu Gln Leu Arg Asn Cys Leu Arg Ile Leu Met Gly Glu
                85                  90                  95

Leu Ser Asn His His Asp His His Asp Glu Phe Cys Leu Met Pro
            100                 105                 110
```

<210> SEQ ID NO 5
<211> LENGTH: 183
<212> TYPE: PRT
<213> ORGANISM: Homo sapiens

<400> SEQUENCE: 5

```
Met Ser Ala Ala Arg Glu Ser His Pro His Gly Val Lys Arg Ser Ala
1               5                   10                  15

Ser Pro Asp Asp Asp Leu Gly Ser Ser Asn Trp Glu Ala Ala Asp Leu
            20                  25                  30

Gly Asn Glu Glu Arg Lys Gln Lys Phe Leu Arg Leu Met Gly Ala Gly
        35                  40                  45

Lys Lys Glu His Thr Gly Arg Leu Val Ile Gly Asp His Lys Ser Thr
    50                  55                  60

Ser His Phe Arg Thr Gly Glu Glu Asp Lys Lys Ile Asn Glu Glu Leu
65                  70                  75                  80

Glu Ser Gln Tyr Gln Gln Ser Met Asp Ser Lys Leu Ser Gly Arg Tyr
                85                  90                  95

Arg Arg His Cys Gly Leu Gly Phe Ser Glu Val Glu Asp His Asp Gly
            100                 105                 110

Glu Gly Asp Val Ala Gly Asp Asp Asp Asp Asp Asp Ser Pro
        115                 120                 125

Asp Pro Glu Ser Pro Asp Asp Ser Glu Ser Asp Glu Ser Glu Lys
    130                 135                 140

Glu Glu Ser Ala Glu Glu Leu Gln Ala Ala Glu His Pro Asp Glu Val
145                 150                 155                 160

Glu Asp Pro Lys Asn Lys Lys Asp Ala Lys Ser Asn Tyr Lys Met Met
                165                 170                 175

Phe Val Lys Ser Ser Gly Ser
            180
```

<210> SEQ ID NO 6
<211> LENGTH: 408
<212> TYPE: PRT
<213> ORGANISM: Homo sapiens

<400> SEQUENCE: 6

```
Met Pro Gly His Leu Gln Glu Gly Phe Gly Cys Val Val Thr Asn Arg
1               5                   10                  15

Phe Asp Gln Leu Phe Asp Asp Glu Ser Asp Pro Phe Glu Val Leu Lys
            20                  25                  30

Ala Ala Glu Asn Lys Lys Lys Glu Ala Gly Gly Gly Val Gly Gly Gly
        35                  40                  45

Pro Gly Ala Lys Ser Ala Ala Gln Ala Ala Gln Thr Asn Ser Asn
50                  55                  60

Ala Ala Gly Lys Gln Leu Arg Lys Glu Ser Gln Lys Asp Arg Lys Asn
65                  70                  75                  80

Pro Leu Pro Pro Ser Val Gly Val Asp Lys Lys Glu Glu Thr Gln
                    85                  90                  95

Pro Pro Val Ala Leu Lys Lys Glu Gly Ile Arg Arg Val Gly Arg Arg
                100                 105                 110

Pro Asp Gln Gln Leu Gln Gly Gly Lys Ile Ile Asp Arg Arg Pro
                115                 120                 125

Glu Arg Arg Pro Pro Arg Glu Arg Arg Phe Glu Lys Pro Leu Glu Glu
            130                 135                 140

Lys Gly Glu Gly Gly Glu Phe Ser Val Asp Arg Pro Ile Ile Asp Arg
145                 150                 155                 160

Pro Ile Arg Gly Arg Gly Leu Gly Arg Gly Arg Gly Arg Gly
                165                 170                 175

Arg Gly Met Gly Arg Gly Asp Gly Phe Asp Ser Arg Gly Lys Arg Glu
                180                 185                 190

Phe Asp Arg His Ser Gly Ser Asp Arg Ser Ser Phe Ser His Tyr Ser
            195                 200                 205

Gly Leu Lys His Glu Asp Lys Arg Gly Gly Ser Gly Ser His Asn Trp
            210                 215                 220

Gly Thr Val Lys Asp Glu Leu Thr Glu Ser Pro Lys Tyr Ile Gln Lys
225                 230                 235                 240

Gln Ile Ser Tyr Asn Tyr Ser Asp Leu Asp Gln Ser Asn Val Thr Glu
                245                 250                 255

Glu Thr Pro Glu Gly Glu Glu His His Pro Val Ala Asp Thr Glu Asn
            260                 265                 270

Lys Glu Asn Glu Val Glu Val Lys Glu Gly Pro Lys Glu Met
        275                 280                 285

Thr Leu Asp Glu Trp Lys Ala Ile Gln Asn Lys Asp Arg Ala Lys Val
    290                 295                 300

Glu Phe Asn Ile Arg Lys Pro Asn Glu Gly Ala Asp Gly Gln Trp Lys
305                 310                 315                 320

Lys Gly Phe Val Leu His Lys Ser Lys Ser Glu Glu Ala His Ala Glu
                325                 330                 335

Asp Ser Val Met Asp His His Phe Arg Lys Pro Ala Asn Asp Ile Thr
            340                 345                 350

Ser Gln Leu Glu Ile Asn Phe Gly Asp Leu Gly Arg Pro Gly Arg Gly
            355                 360                 365

Gly Arg Gly Gly Arg Gly Gly Arg Gly Arg Gly Gly Pro Asn Arg
            370                 375                 380

Gly Ser Arg Thr Asp Lys Ser Ser Ala Ser Ala Pro Asp Val Asp Asp
385                 390                 395                 400

Pro Glu Ala Phe Pro Ala Leu Ala
```

-continued

405

<210> SEQ ID NO 7
<211> LENGTH: 118
<212> TYPE: PRT
<213> ORGANISM: Drosophila melanogaster

<400> SEQUENCE: 7

Met Thr Ser Thr Glu Leu Lys Ile Gly Leu Thr Thr Ser Ala Arg Pro
1               5                   10                  15

Ser Ser Arg Val Leu Lys Pro Pro Gly Gly His Thr Asn Ile Phe
            20                  25                  30

Ser Glu Pro Asp Val Ala Val Pro Ala Pro Arg Ala Lys Tyr Asn Gln
        35                  40                  45

Gln Asn Ser Ser Asn Leu Asn Ala Cys Met Gly Ser Thr Asp Pro Asn
    50                  55                  60

Lys Val Val Glu Lys Ile Arg Glu Glu Val Ser Ile Gln Lys Glu Glu
65                  70                  75                  80

Ala Lys Ser Ala Pro Pro Ser Gln Pro Lys Glu Pro Ala Asn Lys Pro
                85                  90                  95

Ala Ala Thr Asn Gly Glu Ala Arg Gly Arg Val Pro Pro Gly Gly Phe
            100                 105                 110

Ser Ser Gly Gly Phe Trp
        115

<210> SEQ ID NO 8
<211> LENGTH: 61
<212> TYPE: PRT
<213> ORGANISM: Drosophila melanogaster

<400> SEQUENCE: 8

Met Thr Ser Thr Glu Leu Lys Ile Gly Leu Thr Thr Ser Ala Arg Pro
1               5                   10                  15

Ser Ser Arg Val Leu Lys Pro Pro Gly Gly His Thr Asn Ile Phe
            20                  25                  30

Ser Glu Pro Asp Val Ala Val Pro Ala Pro Arg Ala Lys Tyr Asn Gln
        35                  40                  45

Gln Asn Ser Ser Asn Leu Asn Ala Cys Met Gly Ser Thr
    50                  55                  60

<210> SEQ ID NO 9
<211> LENGTH: 57
<212> TYPE: PRT
<213> ORGANISM: Drosophila melanogaster

<400> SEQUENCE: 9

Asp Pro Asn Lys Val Val Glu Lys Ile Arg Glu Glu Val Ser Ile Gln
1               5                   10                  15

Lys Glu Glu Ala Lys Ser Ala Pro Pro Ser Gln Pro Lys Glu Pro Ala
            20                  25                  30

Asn Lys Pro Ala Ala Thr Asn Gly Glu Ala Arg Gly Arg Val Pro Pro
        35                  40                  45

Gly Gly Phe Ser Ser Gly Gly Phe Trp
    50                  55

<210> SEQ ID NO 10
<211> LENGTH: 96
<212> TYPE: PRT
<213> ORGANISM: Drosophila melanogaster

<400> SEQUENCE: 10

Met Ala Asp Glu Gln Pro Asn Leu Val Ala Gly His Pro Pro Ala Leu
1               5                   10                  15

Lys Ala Gly Gly Met Arg Ile Val Gln His Lys Ala Pro Thr Ala Glu
            20                  25                  30

Arg Ala Pro Lys Asp Ala Glu Asp Cys Thr Gly Leu Thr Gln Pro Ile
        35                  40                  45

Ala Val Asn Ser Gly Ser Val Ser Gly Ala Pro Val Lys Gly Asn Thr
    50                  55                  60

Asp Phe Thr Pro Ala Ser Ala Gln Val Ala His Ser Pro Lys Pro Pro
65                  70                  75                  80

Ala Ala Val Gln Gln Lys Pro Gln Ile His Ile Gln Gln Pro Arg Lys
            85                  90                  95

<210> SEQ ID NO 11
<211> LENGTH: 48
<212> TYPE: PRT
<213> ORGANISM: Drosophila melanogaster

<400> SEQUENCE: 11

Met Ala Asp Glu Gln Pro Asn Leu Val Ala Gly His Pro Pro Ala Leu
1               5                   10                  15

Lys Ala Gly Gly Met Arg Ile Val Gln His Lys Ala Pro Thr Ala Glu
            20                  25                  30

Arg Ala Pro Lys Asp Ala Glu Asp Cys Thr Gly Leu Thr Gln Pro Ile
        35                  40                  45

<210> SEQ ID NO 12
<211> LENGTH: 48
<212> TYPE: PRT
<213> ORGANISM: Drosophila melanogaster

<400> SEQUENCE: 12

Ala Val Asn Ser Gly Ser Val Ser Gly Ala Pro Val Lys Gly Asn Thr
1               5                   10                  15

Asp Phe Thr Pro Ala Ser Ala Gln Val Ala His Ser Pro Lys Pro Pro
            20                  25                  30

Ala Ala Val Gln Gln Lys Pro Gln Ile His Ile Gln Gln Pro Arg Lys
        35                  40                  45

<210> SEQ ID NO 13
<211> LENGTH: 96
<212> TYPE: PRT
<213> ORGANISM: Drosophila melanogaster

<400> SEQUENCE: 13

Met Ser Pro Lys Asn Asn His Asp Pro Ser Ser Ser Gly Asp Ser Gly
1               5                   10                  15

Asn Thr Asn Val Gln Glu Ala Asp Leu Gln Glu Met Glu Asp Val Asn
            20                  25                  30

Asn Ser Leu Asp Ala Leu Ser Cys Ala Leu Asp Ala Val Glu Gln Arg
        35                  40                  45

Thr Asp Asp Ile Met Ser Gln Leu Arg Glu Leu Asn Ser Asn Arg
    50                  55                  60

Glu Ile Arg Arg Leu Ile Ala Glu Glu Asn Asp Asn Ala Pro Glu Ser
65                  70                  75                  80

Gly Asp Asp Asn Met Asp Gly Gln Ala Gly Ser Glu Ala Ala Pro Lys

-continued

```
                85                  90                  95
```

<210> SEQ ID NO 14
<211> LENGTH: 48
<212> TYPE: PRT
<213> ORGANISM: Drosophila melanogaster

<400> SEQUENCE: 14

```
Met Ser Pro Lys Asn Asn His Asp Pro Ser Ser Gly Asp Ser Gly
1               5                   10                  15

Asn Thr Asn Val Gln Glu Ala Asp Leu Gln Glu Met Glu Asp Val Asn
                20                  25                  30

Asn Ser Leu Asp Ala Leu Ser Cys Ala Leu Asp Ala Val Glu Gln Arg
            35                  40                  45
```

<210> SEQ ID NO 15
<211> LENGTH: 48
<212> TYPE: PRT
<213> ORGANISM: Drosophila melanogaster

<400> SEQUENCE: 15

```
Thr Asp Asp Ile Met Ser Gln Leu Arg Glu Leu Leu Asn Ser Asn Arg
1               5                   10                  15

Glu Ile Arg Arg Leu Ile Ala Glu Glu Asn Asp Asn Ala Pro Glu Ser
                20                  25                  30

Gly Asp Asp Asn Met Asp Gly Gln Ala Gly Ser Glu Ala Ala Pro Lys
            35                  40                  45
```

<210> SEQ ID NO 16
<211> LENGTH: 41
<212> TYPE: PRT
<213> ORGANISM: Homo sapiens

<400> SEQUENCE: 16

```
Met Ser Gly Pro Asn Gly Asp Leu Gly Met Pro Val Glu Ala Gly Ala
1               5                   10                  15

Glu Gly Glu Glu Asp Gly Phe Gly Glu Ala Glu Tyr Ala Ala Ile Asn
                20                  25                  30

Ser Met Leu Asp Gln Ile Asn Ser Cys
            35                  40
```

<210> SEQ ID NO 17
<211> LENGTH: 42
<212> TYPE: PRT
<213> ORGANISM: Homo sapiens

<400> SEQUENCE: 17

```
Leu Asp His Leu Glu Glu Lys Asn Asp His Leu His Ala Arg Leu Gln
1               5                   10                  15

Glu Leu Leu Glu Ser Asn Arg Gln Thr Arg Leu Glu Phe Gln Gln Gln
                20                  25                  30

Leu Gly Glu Ala Pro Ser Asp Ala Ser Pro
            35                  40
```

<210> SEQ ID NO 18
<211> LENGTH: 60
<212> TYPE: PRT
<213> ORGANISM: Homo sapiens

<400> SEQUENCE: 18

```
Met Ser Ala Ala Arg Glu Ser His Pro His Gly Val Lys Arg Ser Ala
```

```
                 1               5                  10                  15
            Ser Pro Asp Asp Asp Leu Gly Ser Ser Asn Trp Glu Ala Ala Asp Leu
                            20                  25                  30

Gly Asn Glu Glu Arg Lys Gln Lys Phe Leu Arg Leu Met Gly Ala Gly
                        35                  40                  45

Lys Lys Glu His Thr Gly Arg Leu Val Ile Gly Asp
                    50                  55                  60
```

<210> SEQ ID NO 19
<211> LENGTH: 98
<212> TYPE: PRT
<213> ORGANISM: Homo sapiens

<400> SEQUENCE: 19

```
            Gln Ser Met Asp Ser Lys Leu Ser Gly Arg Tyr Arg Arg His Cys Gly
            1               5                   10                  15

Leu Gly Phe Ser Glu Val Glu Asp His Asp Gly Glu Gly Asp Val Ala
                            20                  25                  30

Gly Asp Asp Asp Asp Asp Asp Ser Pro Asp Pro Glu Ser Pro
                        35                  40                  45

Asp Asp Ser Glu Ser Asp Ser Glu Ser Glu Lys Glu Glu Ser Ala Glu
                50                  55                  60

Glu Leu Gln Ala Ala Glu His Pro Asp Glu Val Glu Asp Pro Lys Asn
            65                  70                  75                  80

Lys Lys Asp Ala Lys Ser Asn Tyr Lys Met Met Phe Val Lys Ser Ser
                            85                  90                  95

Gly Ser
```

<210> SEQ ID NO 20
<211> LENGTH: 100
<212> TYPE: PRT
<213> ORGANISM: Homo sapiens

<400> SEQUENCE: 20

```
            Gln Ala Lys Ala Arg Ser Ala Ala Lys Gly Glu Met Glu Gln Ala Lys
            1               5                   10                  15

Arg Asn Gln Ile Lys Ser Glu Gln Arg Ala Glu Lys Lys Ser Met Asn
                            20                  25                  30

Gln Gln Arg Lys Thr Gln Gly Leu Gln Asn Asp Glu Gly Arg Ser Ser
                        35                  40                  45

Arg Asp Ala Arg Ile Lys Leu Gln Pro Lys Lys Val Met Asp Lys Gln
                50                  55                  60

Gly Asp Asp Lys Lys Asp Gln Lys Glu Lys Asp Thr Arg Ser Lys Arg
            65                  70                  75                  80

Pro Gly Leu Arg Lys Lys Arg Asn Val Gln Arg Glu Asn Glu Lys Ser
                            85                  90                  95

Lys Ala Met Met
                        100
```

<210> SEQ ID NO 21
<211> LENGTH: 100
<212> TYPE: PRT
<213> ORGANISM: Homo sapiens

<400> SEQUENCE: 21

```
            Lys Lys Asn Asp Lys Ser Lys Arg Asp Lys Gln Val Arg Lys Ser Ala
            1               5                   10                  15
```

```
Lys Ile Lys Gln Gly Gln Asn Arg Met Gln Lys Ala Gln Leu Asn Lys
            20                  25                  30

Gln Met Ser Thr Lys Ser Arg Gln Gln Leu Arg Glu Asp Pro Lys
        35                  40                  45

Glu Gly Arg Gln Gly Arg Glu Ala Asp Ser Gly Glu Lys Glu Lys Ala
50                  55                  60

Pro Glu Arg Arg Lys Ser Lys Asp Lys Ala Asp Gln Arg Met Asn Thr
65                  70                  75                  80

Ala Glu Leu Lys Ser Gly Ala Arg Arg Val Lys Ala Asp Glu Ile
                85                  90                  95

Met Met Gln Asn
            100

<210> SEQ ID NO 22
<211> LENGTH: 100
<212> TYPE: PRT
<213> ORGANISM: Homo sapiens

<400> SEQUENCE: 22

Gln Lys Met Val Lys Lys Gln Gly Gln Ile Lys Lys Asp Lys Lys Asp
1               5                   10                  15

Arg Gln Ala Lys Glu Asn Gln Asn Lys Glu Leu Ala Lys Gln Arg Arg
            20                  25                  30

Gly Val Ser Glu Lys Glu Met Asp Thr Ile Leu Ala Gln Glu Asp Met
        35                  40                  45

Ser Pro Ala Ala Lys Arg Asp Lys Glu Met Asp Gly Met Gln Ser Lys
50                  55                  60

Arg Asn Ser Lys Ser Lys Arg Lys Arg Gln Ala Arg Gly Lys Gln
65                  70                  75                  80

Thr Asp Pro Gly Leu Arg Arg Lys Ser Lys Ser Ala Arg Gln Ala Arg
                85                  90                  95

Glu Asn Gln Asn
            100

<210> SEQ ID NO 23
<211> LENGTH: 42
<212> TYPE: PRT
<213> ORGANISM: Homo sapiens

<400> SEQUENCE: 23

Gln Ser Asp Glu Pro Met Ile Val Arg Gln Ala Gln Arg Lys Met Asp
1               5                   10                  15

Gln Arg Lys Lys Lys Gly Leu Glu Lys Ala Asp Ala Lys Lys Asn
            20                  25                  30

Gly Asn Glu Arg Ser Gln Arg Ser Ala Thr
        35                  40

<210> SEQ ID NO 24
<211> LENGTH: 42
<212> TYPE: PRT
<213> ORGANISM: Homo sapiens

<400> SEQUENCE: 24

Arg Lys Gln Asp Lys Asn Gly Arg Lys Ser Glu Lys Leu Asn Ala Met
1               5                   10                  15

Gly Gln Ala Ala Asp Met Lys Ser Glu Arg Glu Arg Val Ile Ser Pro
            20                  25                  30

Thr Gln Gln Gln Lys Lys Ala Asp Lys Arg
```

```
                        35                  40

<210> SEQ ID NO 25
<211> LENGTH: 100
<212> TYPE: PRT
<213> ORGANISM: Homo sapiens

<400> SEQUENCE: 25

Gly Lys Pro Lys Gln Ala Lys Leu Ser Glu Lys Ser Ser Phe Gln Ala
1               5                   10                  15

Pro Ala Val Gly Pro Leu Val Lys Arg Arg Glu Asn Ala Arg Arg Ala
                20                  25                  30

Lys Ala Val Thr Lys Leu Gln Glu Lys Lys His Ile Ala Lys Thr Val
                35                  40                  45

Met Lys Ser Val Lys Lys Lys Leu Ile Ala Ser Lys Asn Thr Ala Ser
50                  55                  60

Met Ser Lys Arg Ala Gln Ala Ser Pro Lys Gln Gly Leu Val Lys Gly
65                  70                  75                  80

Gln His Ala Arg Ala Pro Lys Ala Ile Lys Ala Ala Leu Lys Gly Gly
                85                  90                  95

Pro Ala Lys Asp
            100

<210> SEQ ID NO 26
<211> LENGTH: 100
<212> TYPE: PRT
<213> ORGANISM: Homo sapiens

<400> SEQUENCE: 26

Ser Ala Pro Ser Lys Val Lys Gln Arg Ile Val Pro Lys Asn Lys Ser
1               5                   10                  15

Ala Ala Lys Lys Pro Phe Ser Ser Asp Ala Val Lys Arg Lys Ser Gln
                20                  25                  30

Lys Glu Arg Ala Glu Met Thr Gly Val Lys Gly Ala Lys Leu Lys
                35                  40                  45

Lys Ala Leu Ala Ala Lys Pro Leu Ile Lys Pro Ala Pro Met Lys Lys
50                  55                  60

Ala Thr Ala Ala Lys Asn Arg Ala His Ile Ala Val Lys Val Lys Ala
65                  70                  75                  80

Lys His Gly Ser Gly Gln Gly Gln Thr Leu Gln Lys Leu Arg Leu Gly
                85                  90                  95

Ser Arg Ala Gln
            100

<210> SEQ ID NO 27
<211> LENGTH: 100
<212> TYPE: PRT
<213> ORGANISM: Homo sapiens

<400> SEQUENCE: 27

Gln Met Ser Pro Lys Gln Lys Arg Thr Ser Ala Lys Val Lys Ala Val
1               5                   10                  15

Gly Ile Leu Ala Lys Leu Lys Pro Ser Ala Ser Gln Leu Ala His Asn
                20                  25                  30

Ser Ala Lys Lys Ala Glu Lys Arg Val Pro Leu Ile Lys Val Thr Ile
                35                  40                  45

Gly Pro Gln Leu Ala Gly Lys Ala Gln Ser Asp Val Asn Met Leu Arg
50                  55                  60
```

Ser Ala Lys Gly Ala Lys Val Lys Glu Lys Pro Phe Lys Ala Arg
65                  70                  75                  80

Gly Ala Lys Ser Lys Gln Thr Ala His Pro Arg Lys Ala Lys Glu Gly
                85                  90                  95

Arg Lys Ala Ala
            100

<210> SEQ ID NO 28
<211> LENGTH: 42
<212> TYPE: PRT
<213> ORGANISM: Homo sapiens

<400> SEQUENCE: 28

Arg Ala Lys Lys Pro Lys Gln Lys His Lys Ala Gly Arg Lys Gly
1               5                   10                  15

Gly Ala Ala Met Ala Val Ser Pro Leu Leu Pro Val Ala Val Leu Asn
                20                  25                  30

Ser Arg Gln Glu Ser Lys Lys Ile Ala Thr
            35                  40

<210> SEQ ID NO 29
<211> LENGTH: 42
<212> TYPE: PRT
<213> ORGANISM: Homo sapiens

<400> SEQUENCE: 29

Gly Lys Lys His Arg Arg Thr Ala Asn Ala Ala Ala Val Lys Gln
1               5                   10                  15

Ala Gln Gly Val Lys Lys Pro Pro Lys Ser Lys Gly Leu Leu Met Pro
                20                  25                  30

Leu Gln Lys Ile Arg Ser Ala Ser Glu Lys
            35                  40

<210> SEQ ID NO 30
<211> LENGTH: 100
<212> TYPE: PRT
<213> ORGANISM: Homo sapiens

<400> SEQUENCE: 30

Arg Arg Gln Ala Gly Val Gly Lys Ile Arg Met Asp Thr Gly Pro Ala
1               5                   10                  15

Ala Asn Gly Ser Arg Asp Asn Gly Lys Lys Val Lys Val Lys Asp Ser
                20                  25                  30

Leu Ala Ser Phe Lys Asn Ala Arg Glu Glu Pro Gly Phe Pro Gln Asp
            35                  40                  45

Leu Thr Lys Ser Lys Tyr His Glu Ile Arg Gly Gly Asp Glu Arg
    50                  55                  60

Asp Arg Pro Pro Arg Gly Ile Asp Gly Pro Ser His Gly Val Glu Gly
65                  70                  75                  80

Leu His Gly Asn Phe Glu Gln Val Glu Ser Trp Arg Ser Leu Ala Glu
                85                  90                  95

Gln Gly Thr Glu
            100

<210> SEQ ID NO 31
<211> LENGTH: 100
<212> TYPE: PRT
<213> ORGANISM: Homo sapiens

```
<400> SEQUENCE: 31

Arg Pro Lys Leu Glu Gln Val Gly Leu Ala Glu Pro Phe Arg Ser Pro
1               5                  10                  15

Gly Lys Thr Arg Ser Glu His Thr Asn His Glu Asp Asn Gly Glu Glu
            20                  25                  30

Arg Leu Met Gly Ala Val Gly Lys Gly Gln Gly Asp Phe Arg His
        35                  40                  45

Ser Ala Thr Val Ala Asp Arg Gly Ile Gly Val Glu Phe Arg Glu Ser
    50                  55                  60

Ala Asn Lys Tyr Lys Lys Glu Pro Leu Gly Lys Ile Gln Val Gln Gly
65                  70                  75                  80

Asp Trp Asn Ser Asp Ala Arg Gly Asp Pro Asp Gly Arg Glu Ser Ser
                85                  90                  95

Lys Pro Arg Ile
            100

<210> SEQ ID NO 32
<211> LENGTH: 100
<212> TYPE: PRT
<213> ORGANISM: Homo sapiens

<400> SEQUENCE: 32

Gln Asn Ala Asn Gln Gly Ala Arg Pro Phe Ala Gly Phe Leu Ala Val
1               5                  10                  15

Pro Asp Lys Glu Gln Arg Glu Lys Asp Ile Phe Glu Gln Gly Pro Glu
            20                  25                  30

Arg Leu Leu Gly Ser Pro Asp Gly Gly Ser Gly Tyr Arg Gly Arg
        35                  40                  45

Ile Lys Lys Met Val Arg Asp His Pro Gly Lys Ser Ser His Ser Asp
50                  55                  60

Ala Lys Glu Lys Ser Arg Arg Gly Val Thr Pro Trp Asp Glu Asp Arg
65                  70                  75                  80

Ser Val Glu Glu Gly Ala Glu Arg Gly Val Asn Thr Ile Leu Gly Thr
                85                  90                  95

Glu His Asn Lys
            100

<210> SEQ ID NO 33
<211> LENGTH: 42
<212> TYPE: PRT
<213> ORGANISM: Homo sapiens

<400> SEQUENCE: 33

Gln Gly Asp Arg Arg Lys Leu Ser Asn Gly Glu Asn Asp Gln Ala Glu
1               5                  10                  15

Asp Glu Thr Lys Phe Pro Gly His Gly Pro Arg Lys Pro Ala Ile Gly
            20                  25                  30

Ala Lys Glu Ser Ser Arg Gly Val Val Leu
        35                  40

<210> SEQ ID NO 34
<211> LENGTH: 42
<212> TYPE: PRT
<213> ORGANISM: Homo sapiens

<400> SEQUENCE: 34

Pro Arg Arg Ala Lys Ile Glu His Gln Leu Ala Lys Asp Asn Asp Arg
1               5                  10                  15
```

Gly Ser Gly Gly Gly Val Ala Asn Arg Lys Pro Glu Glu Gln Gly Ser
            20                  25                  30

Gly Pro Lys Asp Val Glu Thr Ser Leu Phe
            35                  40

<210> SEQ ID NO 35
<211> LENGTH: 218
<212> TYPE: PRT
<213> ORGANISM: Homo sapiens

<400> SEQUENCE: 35

Met Ser Pro Ile Leu Gly Tyr Trp Lys Ile Lys Gly Leu Val Gln Pro
1               5                   10                  15

Thr Arg Leu Leu Leu Glu Tyr Leu Glu Glu Lys Tyr Glu Glu His Leu
            20                  25                  30

Tyr Glu Arg Asp Glu Gly Asp Lys Trp Arg Asn Lys Lys Phe Glu Leu
            35                  40                  45

Gly Leu Glu Phe Pro Asn Leu Pro Tyr Tyr Ile Asp Gly Asp Val Lys
        50                  55                  60

Leu Thr Gln Ser Met Ala Ile Ile Arg Tyr Ile Ala Asp Lys His Asn
65                  70                  75                  80

Met Leu Gly Gly Cys Pro Lys Glu Arg Ala Glu Ile Ser Met Leu Glu
                85                  90                  95

Gly Ala Val Leu Asp Ile Arg Tyr Gly Val Ser Arg Ile Ala Tyr Ser
            100                 105                 110

Lys Asp Phe Glu Thr Leu Lys Val Asp Phe Leu Ser Lys Leu Pro Glu
        115                 120                 125

Met Leu Lys Met Phe Glu Asp Arg Leu Cys His Lys Thr Tyr Leu Asn
    130                 135                 140

Gly Asp His Val Thr His Pro Asp Phe Met Leu Tyr Asp Ala Leu Asp
145                 150                 155                 160

Val Val Leu Tyr Met Asp Pro Met Cys Leu Asp Ala Phe Pro Lys Leu
                165                 170                 175

Val Cys Phe Lys Lys Arg Ile Glu Ala Ile Pro Gln Ile Asp Lys Tyr
            180                 185                 190

Leu Lys Ser Ser Lys Tyr Ile Ala Trp Pro Leu Gln Gly Trp Gln Ala
        195                 200                 205

Thr Phe Gly Gly Gly Asp His Pro Pro Lys
    210                 215

<210> SEQ ID NO 36
<211> LENGTH: 100
<212> TYPE: PRT
<213> ORGANISM: Homo sapiens

<400> SEQUENCE: 36

Asp Ile Ile Ser Lys Thr Lys Glu Ala Ile Val Pro Glu Lys Tyr His
1               5                   10                  15

Met Pro Ala Lys Arg Gly Gln Glu Thr Pro Val Leu Asn Tyr Tyr Leu
            20                  25                  30

Leu Ile Ala Ser Leu Thr Asn Ile Lys Asp Phe Met Asp Lys Gly Asp
            35                  40                  45

Pro Leu Ile Phe Asp Pro Phe Lys Gln Tyr Ser Ser Ala Lys Arg Asp
        50                  55                  60

Leu Lys Ala Asp His Gly Leu Phe Leu Lys Leu Pro Val Glu Cys Gly
65                  70                  75                  80

```
Trp Tyr Val Arg Cys Gly Leu Leu Arg Tyr Leu Glu Met Gly His Met
                85                  90                  95

Glu Glu Trp Asp
            100

<210> SEQ ID NO 37
<211> LENGTH: 100
<212> TYPE: PRT
<213> ORGANISM: Homo sapiens

<400> SEQUENCE: 37

Cys Arg Pro Ala Ile Val Met His Gly Val Glu Lys Thr Glu Asp Met
1               5                   10                  15

Lys Ile Trp Leu Leu Trp Lys Lys Ser Lys Leu Asn Pro Ile Glu Asn
            20                  25                  30

Glu Lys Ala Leu Gln Val Leu Pro Asp Pro Arg Asp Ala Leu Arg Leu
        35                  40                  45

Cys Pro Glu Leu Asp His Gly Met Phe Asp Lys Met Val Pro Ser Asp
    50                  55                  60

Ala Gly Gly Ile Lys Tyr Ala Phe Tyr Glu Gly Ser His Gly Lys
65                  70                  75                  80

Tyr Leu Phe Ser Ile Phe Leu Gln Thr Arg Leu Asp Lys Ile Glu Thr
                85                  90                  95

Asp Tyr Leu Tyr
            100

<210> SEQ ID NO 38
<211> LENGTH: 100
<212> TYPE: PRT
<213> ORGANISM: Homo sapiens

<400> SEQUENCE: 38

Cys Asp Ala Lys Phe Leu Gly Ile Leu Leu Lys Leu Lys Lys Tyr
1               5                   10                  15

Lys His Ile Gln Asp His Asp Phe Arg Ile Lys His Ile Asp Val Leu
            20                  25                  30

Gly Pro Val Pro Gly Leu Met Tyr Ala Glu Ser Asp Cys Ile Tyr Thr
        35                  40                  45

Pro Ala Glu Ile Ala Thr Tyr Asp Glu Tyr Phe Lys Arg Glu Glu Pro
    50                  55                  60

Tyr Met Trp Lys Glu Leu Val Trp Glu Ser Gly Leu Asp Asp Leu Ser
65                  70                  75                  80

Met Ala Asn Thr Gly Phe Ser Arg Pro Met Pro Asn Leu Lys Leu Gln
                85                  90                  95

Val Lys Gly Arg
            100

<210> SEQ ID NO 39
<211> LENGTH: 42
<212> TYPE: PRT
<213> ORGANISM: Homo sapiens

<400> SEQUENCE: 39

His Leu Glu Phe Val Asn Phe Val Pro Ile Gly Pro Cys Gly Asp Leu
1               5                   10                  15

Tyr Arg Leu Glu Glu Gln Lys Leu Ala Tyr Lys Asp Met Ile Arg
            20                  25                  30
```

```
Ser Asp Ala Tyr Lys Gly Lys Trp Thr Leu
        35                  40

<210> SEQ ID NO 40
<211> LENGTH: 42
<212> TYPE: PRT
<213> ORGANISM: Homo sapiens

<400> SEQUENCE: 40

Phe Glu Ser Phe Tyr Met Glu Pro Leu Leu Trp Thr Asp Lys Ile Asn
1               5                   10                  15

His Leu Tyr Tyr Leu Ile Gly Ala Lys Asp Pro Val Leu Gly Lys Arg
            20                  25                  30

Asp Val Lys Arg Glu Gln Ala Met Gly Cys
        35                  40
```

SCREENING METHOD FOR CLIENT PROTEIN-PROTECTING PROTEIN, AND PHYSIOLOGICALLY ACTIVE PROTEIN-STABILIZING PROTEIN AND PHARMACEUTICAL COMPOSITION COMPRISING SAID PROTEIN

CROSS-REFERENCE TO RELATED APPLICATION

This application is the United States national phase of PCT/JP2019/024515 filed Jun. 20, 2019 and claims priority to U.S. Provisional Patent Application No. 62/734,329 filed Sep. 21, 2018, the disclosures of which are hereby incorporated by reference in their entirety.

The Sequence Listing associated with this application is filed in electronic format via EFS-Web and is hereby incorporated by reference into the specification in its entirety. The name of the text file containing the Sequence Listing is 2101362_ST25.txt. The size of the text file is 33,639 bytes, and the text file was created on May 6, 2021.

TECHNICAL FIELD

The present invention relates to a screening method for a client protein-protecting protein. The present invention also relates to a physiologically active protein-stabilizing protein and a pharmaceutical composition comprising the protein.

BACKGROUND ART

Proteins exert their biological function by being folded into their intrinsic native-state three-dimensional structure. Due to various physical or chemical factors, the structures such as the secondary, tertiary and quaternary structures can be changed without change in primary structure of proteins, leading to changes in physical properties of the proteins. Such a phenomenon is referred to as protein denaturation. Changes associated with denaturation include decrease in protein solubility, loss or reduction in biological activity, and loss of crystallization tendency.

It is generally considered that proteins can be denatured, but examples of highly hydrophilic and highly heat-resistant proteins found in extremophiles are known as exceptions. For example, tardigrade disordered proteins (TDPs), which are required for tardigrade, bear animalcule, to withstand desiccation, are known. Also, late embryogenic abundant (LEA) proteins and associated proteins have been identified in land plants, radiation-resistant bacteria, and desiccation-tolerant animals such as Anemia (brine shrimps) and nematodes, and expression of these proteins is known to be associated with their tolerance to extreme environments including dehydration, freezing and high salinity. In contrast, heat-soluble proteins in mesophiles including mammals have been reported (Non-Patent Documents 1 and 2), but their functions have hardly been revealed.

REFERENCE LIST

Non-Patent Documents

Non-Patent Document 1: T. D. Kim, H. J. Ryu, H. Il Cho, C. H. Yang, J. Kim, Biochemistry. 39, 14839-14846 (2000)

Non-Patent Document 2: C. A. Galea et al., J. Proteome Res. 8, 211-226 (2009)

SUMMARY OF THE INVENTION

An object of the present invention is to provide a novel screening method for a client protein-protecting protein. Another object of the present invention is to provide a physiologically active protein-stabilizing protein and a pharmaceutical composition using the protein.

The present inventors have now found that supernatants and boiled supernatants of cell lysates suppress nonspecific adhesion of proteins, promote expression of functions of the proteins, and protect the activity of the proteins from desiccation. The present inventors have also found that proteins having an intrinsically disordered structure are present abundantly in boiled supernatants of cell lysates by an intrinsically disordered region prediction method, and that the amino acid compositions of these proteins have tendencies different from those of conventionally-known typical intrinsically disordered regions. Also, the present inventors have selected proteins having an intrinsically disordered structure from the human proteome using an intrinsically disordered region prediction method, found that these proteins have high heat resistance characteristics, and named these proteins Hero (HEat-Resistant Obscure) proteins. The present inventors have also found that the Hero proteins protect client proteins from denaturation due to various stress conditions and suppress aggregation of aggregate proteins in vitro and in vivo. Further, the present inventors have found that the physiological activity of the Hero proteins are maintained even when the proteins are fragmented and even when their amino acid sequences are shuffled while the composition ratio of amino acid residues is maintained. The present invention is based on these findings.

The present invention provides the following inventions.

[1] A method for screening for a client protein-protecting protein, comprising the step (evaluation step) of evaluating stability of a client protein in the presence of a protein (candidate protein) having an intrinsically disordered structure.

[2] The method according to [1], wherein, in the evaluation step, the stability of the client protein is evaluated using a degree of protection of the client protein from stress as an index.

[3] The method according to [2], wherein the stress is one or more selected from the group consisting of physical stresses and chemical stresses.

[4] The method according to any one of [1] to [3], wherein the client protein is a physiologically active protein.

[5] The method according to [4], wherein the physiologically active protein is selected from the group consisting of antibodies, antibody fragments, enzymes, hormones, cytokines and interferons.

[6] The method according to [4] or [5], which is a method for identifying a protein useful for stabilization of the physiologically active protein.

[7] The method according to any one of [4] to [6], wherein the physiologically active protein is an active ingredient of a medicine.

[8] The method according to any one of [4] to [7], wherein the stability of the physiologically active protein is evaluated in accordance with conditions for a stability test required for approval for manufacture of the medicine.

[9] The method according to any one of [1] to [8], wherein the client protein is a non-aggregate protein.

[10] The method according to [1], wherein, in the evaluation step, the stability of the client protein is evaluated using a degree of aggregation of the protein as an index.

[11] The method according to [10], wherein the aggregation of the protein is measured by one or more selected from the group consisting of a filter trap assay or protein localization in a cell, pulse shape analysis (PulSA), phenotype analysis, detection using a protein aggregation detecting dye (thioflavin T (ThT)), and detection using a protein aggregation detecting reagent (ProteoStat).

[12] The method according to any one of [1], [10] and [11], wherein the client protein is an aggregate protein.

[13] The method according to [12], wherein the aggregate protein is a protein causing development and/or progression of a disease.

[14] The method according to [13], which is a method for screening for a protein effective in treatment, prevention or improvement of the disease.

[15] The method according to [14], wherein the disease is a disease which develops and/or progresses upon abnormal aggregation of the protein.

[16] The method according to [15], wherein the disease which develops and/or progresses upon abnormal aggregation of the protein is a neurodegenerative disease.

[17] The method according to any one of [1] to [16], wherein the candidate protein is of mammalian origin.

[18] The method according to any one of [1] to [17], wherein the candidate protein is a protein in which a median of IUPred scores of all amino acid residues is greater than 0.5.

[19] The method according to any one of [1] to [18], wherein the candidate protein is a protein in which more than 50% of amino acid residues relative to the entire sequence have an IUPred score of greater than 0.3.

[20] The method according to any one of [1] to [19], wherein the candidate protein is a protein which remains heat-soluble after a heat treatment.

[21] The method according to any one of [1] to [20], which further comprises the step (selection step) of selecting one or more candidate protein(s) from a protein population using the intrinsically disordered structure of the protein as an index.

[22] The method according to [21], wherein the protein population is of mammalian origin.

[23] The method according to [21] or [22], wherein, in the selection step, the intrinsically disordered structure of the protein is evaluated by an intrinsically disordered region prediction method.

[24] The method according to [23], wherein the intrinsically disordered region prediction method is carried out using a program selected from the group consisting of IUPred, D2P2, GlobPlot, GLOBPLOT2, FoldIndex, IsUnstruct, PONDR VL-XT, DisEMBL, PONDR VL3, PONDR VL3H, RONN, PONDR VSL2B, PONDR VSL2P, Spritz and SLIDER.

[25] The method according to any one of [21] to [24], wherein, in the selection step, the intrinsically disordered structure of the protein is evaluated by IUPred.

[26] The method according to [25], wherein a protein of interest in which a median of IUPred scores of all amino acid residues is greater than 0.5 in IUPred is selected as the candidate protein.

[27] The method according to [21] or [22], wherein, in the selection step, the intrinsically disordered structure of the protein is evaluated by analysis based on heat solubility.

[28] The method according to [27], wherein a protein which remains heat-soluble after a heat treatment is selected as the candidate protein.

[29] An agent for stabilizing a physiologically active protein comprising a protein selected from the group consisting of the following (a), (b), (c), (d) and (e):
(a) a protein having any one of amino acid sequences of SEQ ID NOs: 1 to 6;
(b) a protein having an amino acid sequence obtained by shuffling any one of amino acid sequences of SEQ ID NOs: 1 to 6;
(c) a protein having a fragment sequence of any one of amino acid sequences of SEQ ID NOs: 1 to 6;
(d) a protein which satisfies an amino acid residue composition ratio (the amino acid residue composition ratio including a range of ±5%) indicated in Table 1, 2, 3, 4, 5 or 6, and has an amino acid sequence having a length of 43 amino acid residues or more; and
(e) a protein substantially identical with the protein (a), (b), (c) or (d).

[30] A pharmaceutical composition comprising: a protein selected from the group consisting of the proteins (a), (b), (c), (d) and (e) as defined in [29]; and a physiologically active protein.

[31] The agent according to [29] and the pharmaceutical composition according to [30], wherein the physiologically active protein is an active ingredient of a medicine.

[32] The agent according to [29] or [31] and the pharmaceutical composition according to [30] or [31], wherein the physiologically active protein is selected from the group consisting of antibodies, antibody fragments, enzymes, hormones, cytokines and interferons.

[33] The agent according to [29], [31] or [32] and the pharmaceutical composition according to any one of [30] to [32], wherein the fragment sequence of the protein (c) has at least 43 amino acid residues.

[34] The agent according to any one of [29] and [31] to [33] and the pharmaceutical composition according to any one of [30] to [33], wherein the protein (c) has an activity of stabilizing the physiologically active protein.

[35] The agent according to [29], [31] or [32] and the pharmaceutical composition according to any one of [30] to [32], wherein the substantially identical protein (e) is a protein selected from the group consisting of the following (i), (ii), (iii), (iv), and (v):
(i) a protein which comprises an amino acid sequence having 80% or more identity with the amino acid sequence as defined in any one of (a), (b), (c) and (d) of [29], and which has an activity of stabilizing the physiologically active protein;
(ii) a protein which comprises an amino acid sequence in which one or more amino acid(s) is/are deleted, substituted, inserted and/or added in the amino acid sequence as defined in any one of (a), (b), (c) and (d) of [29], and which has an activity of stabilizing the physiologically active protein;
(iii) a protein which comprises an amino acid sequence encoded by a base sequence having 80% or more identity with a base sequence encoding the amino acid sequence as defined in any one of (a), (b), (c) and (d) of [29], and which has an activity of stabilizing the physiologically active protein;
(iv) a protein comprising an amino acid sequence encoded by a base sequence in which one or more base(s) is/are deleted, substituted, inserted and/or added in a base sequence encoding the amino acid sequence as defined in any one of (a), (b), (c) and (d) of [29], and which has an activity of stabilizing the physiologically active protein; and (v) a protein which comprises an amino acid sequence encoded by a polynucleotide that hybridizes, under stringent conditions, with a polynucleotide consisting of a sequence complementary to a base sequence encoding the amino acid sequence as defined in any one of (a), (b), (c) and (d) of [29], and which has an activity of stabilizing the physiologically active protein.

[36] The pharmaceutical composition according to any one of [30] to [35], wherein the physiologically active protein is conjugated to the protein selected from the group consisting of the proteins (a), (b), (c), (d) and (e).

The method of the present invention is advantageous in enabling selection of a client protein-protecting protein, especially, a protein useful for stabilization of a physiologically active protein or a protein effective in treatment, prevention or improvement of a disease which develops and/or progresses upon abnormal aggregation of the protein.

DETAILED DESCRIPTION OF THE INVENTION

Definition

Figure 1:
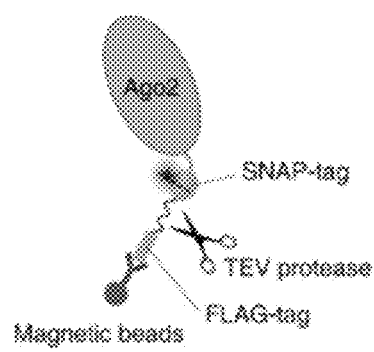
FIG. 1 shows that heat-soluble proteins improve the molecular behavior of *Drosophila* Argonaute 2 (Ago2) protein in vitro. (A) A schematic diagram of FLAG-TEV-SNAP-Ago2 immunopurified on magnetic beads. (B) FLAG-TEV-SNAP-Ago2 was immunopurified on magnetic beads via an anti-FLAG antibody, and then the FLAG tag was cleaved off by TEV protease in a buffer, a crude lysate from *Drosophila* S2 cells or human HEK293T cells, or its boiled supernatant. +PK indicates that the boiled supernatants were mostly deproteinized by proteinase K in advance. The eluted Ago2 (top panel) and the Ago2 remaining on the beads (middle panel) were visualized with a red fluorescent dye covalently bonded to the SNAP tag. All the proteins contained in the eluate were visualized by Coomassie Brilliant Blue (CBB) staining (bottom panel). The numerical values above the panels indicate relative amounts of the eluted Ago2 normalized to that with the crude S2 cell lysate. The proteins remaining in the boiled supernatants have an effect for promoting Ago2 elution.
Figure 1:
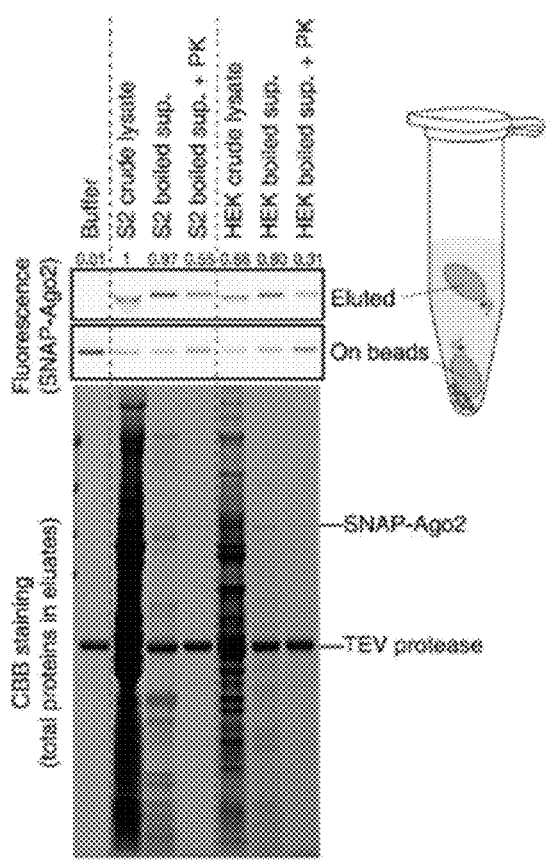

In the present invention, the "client protein" refers to a protein to be protected from stress conditions. Examples of the client protein include physiologically active proteins. In the present invention, the "physiologically active protein" is not particularly limited, and examples thereof include antibodies, antibody fragments, enzymes, hormones, cytokines and interferons. In the present invention, the physiologically active protein can be an active ingredient of a medicine or a candidate therefor.

Examples of the client protein include aggregate proteins. In the present invention, the "aggregate protein" can be selected from proteins causing development and/or progression of a disease.

In the present invention, the "candidate protein" can be a protein of mammalian (preferably, human) origin. In the present invention, the "protein population" can be a protein population of mammalian (preferably, human) origin. As used herein, the meaning of the "protein" includes peptides and polypeptides.

In the present invention, the "intrinsically disordered structure" refers to a structure having no fixed three-dimensional structure in the native state, and is synonymous with "intrinsically irregular structure." Here, the "intrinsically disordered" is synonymous with "intrinsically unstructured". Further, proteins having an "intrinsically disordered structure" are referred to as intrinsically disordered proteins.

In the present invention, the "polynucleotide" includes DNA and RNA, and further includes modified products thereof and artificial nucleic acids, but is preferably DNA. DNA also includes cDNA, genomic DNA and chemically synthesized DNA.

In the present invention, the "screening method (method for screening)" means a method of selecting a substance having a predetermined property based on evaluation results of candidate substances, and the candidate substance may be one or more substances. The "screening method" of the present invention includes an "identification method" for identifying the candidate substance as a substance having a predetermined property. The "screening method" of the present invention can be an in vitro screening method.

<<Screening Method>>
<Evaluation Step/Step (B)>
Candidate Protein

The screening method of the present invention is characterized by comprising the step of evaluating stability of a client protein in the presence of a protein having an intrinsically disordered structure as a candidate protein (sometimes referred to as "evaluation step" or "step (B)" herein).

The candidate protein to be evaluated in step (B) is not particularly limited as long as it is a protein having an intrinsically disordered structure, and a protein predicted to have an intrinsically disordered structure by an intrinsically unstructured/disordered region/domain prediction method can be used. For example, a protein predicted to have an intrinsically disordered structure by IUPred (Z. Dosztanyi, V. Csizmok, P. Tompa, I. Simon, J. Mol. Biol. 347, 827-839 (2005)) can be subjected, as the candidate protein, to step (B). Preferably, a protein in which a median of IUPred scores of all amino acid residues is greater than 0.5 can be used as the candidate protein. Alternatively, a protein in which more than 50% (preferably, more than 60%, more than 70%, more than 75%, or more than 80%) of amino acid residues relative to the entire sequence have an IUPred score of greater than 0.3 (preferably, greater than 0.4, greater than 0.5, or greater than 0.6) can be subjected, as the candidate protein, to step (B).

Also, in the screening method of the present invention, a protein predicted to have an intrinsically disordered structure by analysis based on heat solubility can be subjected, as the candidate protein, to step (B). Preferably, a protein which remains heat-soluble after a heat treatment can be used as the candidate protein.

Step (B) may be carried out in combination with the evaluation of the stability of the client protein in the absence of the candidate protein or the evaluation of the stability of the client protein in the presence of a control protein. The control protein can be selected from proteins which are not proteins that protect the client protein, and can be, for example, bovine serum albumin (BSA), glutathione S-transferase (GST) and other proteins, which are widely used as control proteins in the field of biochemistry.

In step (B), for example, when the degree of stability of the client protein in the presence of the candidate protein is above the degree of stability in the absence of the candidate protein or the degree of stability in the presence of the control protein (preferably, when the former degree is above the latter degree with a significant difference), it can be assessed that the candidate protein contributes to the stabilization of the client protein. Specifically, the screening method of the present invention may further comprise, after step (B), the step of (C) determining that the candidate protein is a client-protein protecting protein, when the degree of stability of the client protein in the presence of the candidate protein is above the degree of stability in the absence of the candidate protein or the degree of stability in the presence of the control protein (preferably, when the former degree is above the latter degree with a significant difference).

Step (B) is not limited in its embodiment as long as the effect of the candidate protein on the stability of the client protein can be evaluated. For example, a recombinant protein of the candidate protein may be prepared according to a known method based on amino acid sequence information to carry out the evaluation step, or the candidate protein may be forcibly expressed or knocked down or out in cells or individuals to carry out the evaluation step. Alternatively, the effect of the candidate protein can be verified, for example, by inhibiting the function of the candidate protein with an antibody or the like. In addition, a lysate may be prepared from a sample in which the candidate protein is forcibly expressed or knocked down in cells or individuals based on base sequence information to carry out step (B) using the crude lysate itself without purification of the candidate protein as a recombinant protein. In step (B) of evaluating the stability, any of these methods may be used, or a combination of these methods may be used.

Evaluation of Protection from Stress

In the screening method of the present invention, in the evaluation step, the stability of the client protein can be evaluated using a degree of protection of the client protein from stress as an index. The protection of the client protein from stress can be protection of the client protein from denaturation under stress conditions.

In the evaluation step, when the stability of the client protein is evaluated using the degree of protection of the client protein from stress as an index, a physiologically active protein or a non-aggregate protein can be selected as the client protein. In this case, the screening method of the present invention can be a method for screening for a protein useful for stabilization of the physiologically active protein.

In the present invention, the "stress" is stress on a protein, specifically stress to denature a protein, and examples of such stress include physical stresses and chemical stresses. Examples of physical stresses include heating, storage at room temperature, freezing, thawing, low temperature, heat shock, desiccation, pressure, adhesion, stirring, ultrasonic waves, dilution, enrichment, daily light rays, ultraviolet rays, and X-rays. Examples of chemical stresses include treatments with denaturing agents such as acids, alkalies, urea, guanidine hydrochloride, urea, organic solvents and surfactants, and treatments with enzymes such as protease.

In step (B), for example, when the degree of protection of the client protein from stress in the presence of the candidate protein is above the degree of protection in the absence of the candidate protein or the degree of prediction in the presence of the control protein (preferably, when the former degree is above the latter degree with a significant difference), it can be assessed that the candidate protein contributes to the protection of the client protein from stress. Specifically, the screening method of the present invention may further comprise, after step (B), the step of (C1) determining that the candidate protein is a protein which protects the client protein from stress (or a protein useful for stabilization of the client protein), when the degree of protection of the client protein from stress in the presence of the candidate protein is above the degree of protection in the absence of the candidate protein or the degree of protection in the presence of the control protein (preferably, when the former degree is above the latter degree with a significant difference).

When the client protein is a physiologically active protein, the degree of protection of the client protein from stress can be evaluated using the activity of the physiologically active protein as an index. For example, the degree of protection of the client protein from stress can be evaluated based on a proportion (percentage) of the residual physiological activity after loading of stress to the physiological activity before loading of stress. As a rate of the residual physiological activity after loading of stress is higher, the degree of protection from stress can be said to be higher.

In the screening for a protein having a protective effect on the physiologically active protein, the stability (for example, storage stability or light stability) of the physiologically active protein as a medicine in the presence of the candidate protein can be evaluated in step (B). In this case, an evaluation test may be conducted in accordance with conditions for a stability test required for approval for manufacture of the medicine in step (B). For example, for the storage stability, a stability evaluation test can be conducted under conditions for a long-term storage test, an intermediate test, or an accelerated test required for the approval for manufacture of the medicine. In the case where step (B) is carried out in accordance with the conditions for a stability test required for the approval for manufacture of the medicine, the screening method may further comprise, after step (B), the step of (C2) determining that the candidate protein is a protein useful for stabilization of the physiologically active protein, when the degree of stability of the physiologically active protein (preferably, physiologically active protein which is an active ingredient of the medicine) in the presence of the candidate protein is above the degree of stability in the absence of the candidate protein or the degree of stability in the presence of the control protein (preferably, when the former degree is above the latter degree with a significant difference). In this case, the screening method of the present invention can be a method for identifying a protein useful for stabilization of the physiologically active protein (preferably, stabilization, as the medicine, of the physiologically active protein which is an active ingredient of the medicine).

Evaluation of Suppression of Aggregation

In the screening method of the present invention, in step (B), the stability of the client protein can be evaluated using a degree of aggregation of the protein as an index.

In step (B), when the stability of the client protein is evaluated using the degree of aggregation of the protein as an index, the client protein can be an aggregate protein, and, the aggregate protein can be selected from proteins causing development and/or progression of a disease, as described above.

In step (B), when the stability of the client protein is evaluated using the degree of aggregation of the aggregate protein as an index, and the client protein is an aggregate protein causing development and/or progression of the disease, then the screening method of the present invention can be a method for screening for a protein effective in treatment, prevention or improvement of a disease or a candidate therefor.

The disease is, for example, a disease which develops and/or progresses upon abnormal aggregation of the protein, and specific examples thereof include neurodegenerative diseases, muscle diseases and diseases caused by amyloid deposition. Examples of neurodegenerative diseases include Alzheimer disease, Parkinson disease, Huntington chorea, polyglutamine disease, amyotrophic lateral sclerosis (ALS), frontotemporal dementia (FTD), and prion diseases. Further, examples of neurodegenerative diseases include α-synucleinopathy, serpinopathy, spinocerebellar deformity (e.g., spinocerebellar ataxia type 1 (SCA1), spinocerebellar ataxia type 2 (SCA2), spinocerebellar ataxia type 6 (SCA6), spinocerebellar ataxia type 7 (SCAT), spinocerebellar ataxia type 17 (SCA17)), tauopathy, secondary (AA) amyloidosis, spinal and bulbar muscular atrophy (SBMA or Kennedy disease), frontotemporal dementia associated with chromium 17/parkinsonism, Pick disease, diffuse Levi body dementia (DLBD), multiple system atrophy (MSA), dystrophia myotonica, dentato-rubro-pallido-luysian atrophy (DRPLA), Friedreich's ataxia, fragile X syndrome, fragile XE mental retardation, Machado-Joseph disease (MJD or SCA3), familial encephalopathy with neuroserpin inclusion bodies (FENIB), corticobasal degeneration (CBD), progressive supranuclear palsy (PSP), amyotrophic lateral sclerosis/ parkinsonism dementia complex, amyotrophic lateral sclerosis (ALS), Wilson disease, neurofibromatosis type 2, demyelinating peripheral neuropathy, retinitis pigmentosa, argyrophilic grain dementia, corticobasal degeneration, diffuse neurofibrillary tangles with calcification, Hallervorden-Spatz disease, Niemann-Pick disease type C, subacute sclerosing panencephalitis, transmissible spongiform encephalopathy (TSE), dialysis-related amyloidosis, cerebral amyloid angiopathy, inclusion body myositis, frontotemporal dementia-FUS (FTD-FUS), Creutzfeldt-Jakob disease, familial amyloidosis, cerebral (3 amyloid angiopathy, retinal ganglion cell degeneration in glaucoma, trinucleotide repeat disease, familial British dementia, familial Danish dementia, amyloidosis, cerebral autosomal dominant arteriopathy with subcortical infarct and leukoencephalopathy (CADASIL), Alexander disease, seipinopathy, familial amyloid neuropathy, and senile systemic amyloidosis. Examples of the disease which develops and/or progresses upon abnormal aggregation of the protein include cataract, cystic fibrosis, type 2 diabetes, chronic liver disease, hemolytic anemia, Marfan syndrome, emphysema, idiopathic pulmonary fibrosis, Down syndrome, age-related macular degeneration, light-chain (AL) amyloidosis (primary systemic amyloidosis), heavy-chain (AH) amyloidosis, aortic medial amyloidosis, ApoAI amyloidosis, ApoAII amyloidosis, ApoAIV amyloidosis, Finnish familial amyloidosis (FAF), lysozyme amyloidosis, fibrinogen amyloidosis, dialysis amyloidosis, inclusion body myositis/myopathy, retinitis pigmentosa with rhodopsin mutation, medullary thyroid cancer, atrial amyloidosis, pituitary prolactinoma, hereditary lattice corneal dystrophy, cutaneous lichen amyloidosis, Mallory body, corneal lactoferrin amyloidosis, alveolar proteinosis, odontogenic (Pindborg) tumor amyloid, seminal vesicle amyloid, apolipoprotein C2 amyloidosis, apolipoprotein C3 amyloidosis, Lect2 amyloidosis, insulin amyloidosis, galectin-7 amyloidosis (primary localized cutaneous amyloidosis), corneodesmosin amyloidosis, enfuvirtide amyloidosis, and drepanocytosis.

As described above, the client protein can be an aggregate protein causing development and/or progression of the disease. Examples of the aggregate protein causing development and/or progression of the disease include amyloid β which is a causative protein of Alzheimer disease; α-synuclein and parkin which are causative proteins of Parkinson disease; huntingtin which is a causative protein of Huntington chorea; a polyglutamine sequence which is a causative protein of polyglutamine disease; 43-kDa TAR DNA binding protein (TDP-43), superoxide dismutase, FUS (Fused in sarcoma), C9ORF72 and ubiquilin 2 which are causative proteins of amyotrophic lateral sclerosis (ALS) and frontotemporal dementia (FTD); prion, EWSR, hnRNPA1, A2, FUS and amyloid which are causative proteins of prion disease; α-synuclein which is a causative protein of α-synucleinopathy; serpin which is a causative protein of serpinopathy; crystallin which is a causative protein of cataract; Ataxin 3 which is a causative protein of spinocerebellar ataxia; microtubule-associated protein tau which is a causative protein of tauopathy; amyloid A protein which is a causative protein of secondary (AA) amyloidosis; cystic fibrosis transmembrane conductance regulator (CFTR) protein which is a causative protein of cystic fibrosis; islet amyloid polypeptide (IAPP; amylin) which is a causative protein of type 2 diabetes; an androgen receptor which is a causative protein of spinal and bulbar muscular atrophy; FUS (Fused in sarcoma) which is a causative protein of frontotemporal dementia-FUS (FTD-FUS); prion which is a causative protein of Creutzfeldt-Jakob disease; transthyretin which is a causative protein of familial amyloidosis; amyloid β which is a causative protein of cerebral β amyloid angiopathy; amyloid β which is a causative protein of retinal ganglion cell degeneration in glaucoma; a protein with tandem glutamine elongation which is a causative protein of trinucleotide repeat disease; ABri which is a causative protein of familial British dementia; ADan which is a causative protein of familial Danish dementia; cystatin C which is a causative protein of hereditary cerebral hemorrhage with amyloidosis; Notch 3 which is a causative protein of cerebral autosomal dominant arteriopathy with subcortical infarct and leukoencephalopathy (CADASIL) with subcortical infarction and leukoencephalopathy; glial fibrous acidic protein (GFAP) which is a causative protein of Alexander disease; seipin which is a causative protein of seipinopathy; transthyretin which is a causative protein of familial amyloid neuropathy and senile systemic amyloidosis; monoclonal immunoglobulin light chain which is a causative protein of light-chain (AL) amyloidosis (primary systemic amyloidosis); monoclonal immunoglobulin heavy chain which is a causative protein of heavy-chain (AH) amyloidosis; medan (lactadherin) which is a causative protein of aortic medial amyloidosis; apolipoprotein AI which is a causative protein of ApoAI amyloidosis; apolipoprotein AII which is a causative protein of ApoAII amyloidosis; apolipoprotein AIV which is a causative protein of ApoAIV amyloidosis; gelsolin which is a causative protein of Finnish familial amyloidosis (FAF); lysozyme which is a causative protein of lysozyme amyloidosis; fibrinogen which is a causative protein of fibrinogen amyloidosis; beta 2 microglobulin which is a causative protein of dialysis amyloidosis; amyloid β peptide (Aβ) which is a causative protein of inclusion body myositis/myopathy; rhodopsin which is a causative protein of retinitis pigmentosa with rhodopsin mutation; calcitonin which is a causative protein of medullary thyroid cancer; an atrial natriuretic factor which is a causative protein of atrial amyloidosis; prolactin which is a causative protein of pituitary prolactinoma; keratoepithelin which is a causative protein of hereditary lattice corneal dystrophy; keratin which is a causative protein of cutaneous lichen amyloidosis; keratin intermediate filament protein which is a causative protein of Mallory body; lactoferrin which is a causative protein of corneal lactoferrin amyloidosis; surfactant protein C (SP-C) which is a causative protein of alveolar proteinosis; odontogenic ameloblast-associated protein which is a causative protein of odontogenic (Pindborg) tumor amyloid; semenogelin I which is a causative protein of seminal vesicle amyloid; apolipoprotein C2 (ApoC2) which is a causative protein of apolipoprotein C2 amyloidosis; apolipoprotein C3 (ApoC3) which is a causative protein of apolipoprotein C3 amyloidosis; Leukocyte chemotactic factor-2 (Lect2), which is a causative protein of Lect2 amyloidosis; insulin which is a causative protein of insulin amyloidosis; galectin-7 (Gal7) which is a causative protein of galectin-7 amyloidosis (primary localized cutaneous amyloidosis); corneodesmosin which is a causative protein of corneodesmosin amyloidosis; enfuvirtide which is a causative protein of enfuvirtide amyloidosis; and hemoglobin which is a causative protein of drepanocytosis.

In step (B), for example, when the degree of aggregation of the client protein in the presence of the candidate protein selected in step (A) is below the degree of aggregation in the absence of the candidate protein or the degree of aggregation in the presence of the control protein (preferably, when the former degree is below the latter degree with a significant difference), it can be assessed that the candidate protein contributes to the suppression of the aggregation of the client protein. Specifically, the screening method of the present invention may further comprise, after step (B), the step of (C3) determining that the candidate protein is a protein which suppresses the aggregation of the client protein (or a protein effective in treatment, prevention or improvement of the disease or a candidate therefor), when the degree of aggregation of the client protein in the presence of the candidate protein is below the degree of stability in the absence of the candidate protein or the degree of stability in the presence of the control protein (preferably, when the former degree is below the latter degree with a significant difference).

When the client protein is an aggregate protein, the degree of aggregation of the client protein can be measured by a known measuring means. For example, aggregates can be measured quantitatively by a filter trap assay, analysis of protein localization in cells, pulse shape analysis (PulSA), or phenotype analysis. In the screening method of the present invention, the degree of aggregation of the client protein can be evaluated based on the amount of aggregates produced, and it can be said that the effect for suppressing aggregation of the client protein is higher as the amount of aggregates produced is smaller.

<Selection Step/Step (A)>

The screening method of the present invention may comprise, before step (B), the step of selecting a candidate protein from a protein population using an intrinsically disordered structure of the protein as an index (sometimes referred to as "selection step" or "step (A)" herein). Step (A) can be carried out using an intrinsically disordered region prediction method.

In the present invention, the meaning of the "intrinsically unstructured/disordered region/domain prediction method" includes programs and systems using the intrinsically unstructured/disordered region/domain prediction method, and known programs and systems can be used. Examples of such programs and systems include IUPred (Z. Dosztanyi, V. Csizmok, P. Tompa, I. Simon, J. Mol. Biol. 347, 827-839 (2005)), D2P2 (URL: http://d2p2.pro/), GLOBPLOT, GLOBPLOT2, FoldIndex, IsUnstruct, DisEMBL, PONDR VL-XT, PONDR VL3, PONDR VL3H, PONDR VSL2B, PONDR VSL2P, RONN, ESpritz and SLIDER.

As the index for evaluating the intrinsically disordered structure of a protein by the intrinsically disordered region prediction methods can be appropriately determined based on the characteristics and criteria in each of the prediction methods. Examples of the index include the ratio of the intrinsically disordered region to the entire sequence (sequence length), the median of scores (e.g., mean value) indicating the intrinsically disordered structure, the amino acid composition of the intrinsically disordered region, the length of the intrinsically disordered region, the ratio between hydrophobic and hydrophilic amino acids in the amino acid composition, and the charge (PI value) of the intrinsically disordered structural region/domain.

For example, a score of an amino acid residue at a given position of 0.5 or greater in IUPred indicates that the amino acid residue is highly likely to be a part of a disordered region (Z. Dosztanyi, V. Csizmok, P. Tompa, I. Simon, J. Mol. Biol. 347, 827-839 (2005)). Accordingly, in the case where the intrinsically disordered structure of a protein is evaluated by IUPred, when a median of IUPred scores of all amino acid residues for a protein of interest is, for example, greater than 0.5, preferably greater than 0.6, the protein can be assessed as the candidate protein. Also, in the case where a protein of interest has high IUPred scores in the entire sequence, the protein can be assessed as the candidate protein. For example, a protein in which more than 50% (preferably, more than 60%, more than 70%, more than 75%, or more than 80%) of amino acid residues relative to the entire sequence have an IUPred score of greater than 0.3

(preferably, greater than 0.4, greater than 0.5, or greater than 0.6) can be assessed as the candidate protein.

When step (A) is carried out using a structure prediction program as described above, the protein population can be the human proteome and its sequence data, such as a human genome gene product database and protein sequence data from a human protein database (UniProt human proteome; UP0000005640, human protein atlas).

Further, in the case where the intrinsically disordered structure of a protein of interest is evaluated based on an isoelectric point (pI value), the protein of interest can be assessed as the candidate protein when the pI is 6 or less or 8 or more. Preferably when the pI is 5 or less or 9 or more, more preferably when the pI is 4.5 or less or 10 or more, further preferably when the pI is 4 or less or 11 or more, particularly preferably when the pI is 3.5 or less or 12 or more, the protein of interest can be assessed as the candidate protein.

Also, step (A) of the screening method of the present invention can be carried out by analysis based on heat solubility, and a protein having an intrinsically disordered structure can be selected as the candidate protein. Step (A) can be carried out only by the intrinsically unstructured/disordered region/domain prediction method or only by the analysis based on heat solubility, but may be carried out by a combination of the intrinsically unstructured/disordered region/domain prediction method and the analysis based on heat solubility.

For example, when the protein of interest is heated (preferably, boiled) in an aqueous solution, the analysis based on heat solubility can be carried out using, as an index, a phenomenon in which the protein of interest is present in the supernatant without precipitation after heating. That is, when the protein of interest is heated (preferably, boiled) in an aqueous solution, the protein of interest, which is present in the supernatant without precipitation after heating, can be selected as the candidate protein. It is considered that proteins which are soluble in heated supernatants (i.e., heat-soluble proteins) are highly likely to have an intrinsically disordered structure under physiological conditions. The heating conditions are not particularly limited as long as proteins having a typical higher-order structure can be denatured, and can be, for example, 5 to 20 minutes at 80 to 100° C., preferably 10 to 20 minutes at 85° C. to 100° C., more preferably 15 minutes at 90 to 97° C. In a preferred embodiment of the present invention, a boiled supernatant (sometimes referred to simply as "boiled supernatant" herein) can be used as the heated supernatant.

When step (A) is carried out by the analysis based on heat solubility, the protein population can be derived from human cells, tissues or body fluids, non-human animals, plants, bacteria, viruses or the like, and examples thereof include human epithelial cells and nervous tissues. Further, since the protein having the protein-protecting effect, which is identified by the screening method of the present invention, can be utilized as an agent for stabilizing a medicine as will be described later, the protein population can be derived from human normal cells, normal tissues or normal organs, body fluids of a healthy person, or the like.

When step (A) is carried out by the analysis based on heat solubility, a heat-soluble protein can be prepared as follows. For example, when the protein population is derived from cells, the cells are lysed; a lysate (crude cell lysate) is heated; a supernatant is recovered by centrifugation; and proteins contained in the supernatant can be obtained as the heat-soluble proteins. When the protein population is present in various living tissues, crushing and suspending treatments are performed; a supernatant is recovered by centrifugation; the supernatant is heated; an additional supernatant is recovered by centrifugation; and proteins contained in the supernatant can be obtained as the heat-soluble proteins.

The heat-soluble proteins present in the recovered supernatant can be identified, for example, by high-performance liquid chromatography/mass spectrometry (LC/MS), and these proteins can be selected as the candidate proteins.

When step (A) is carried out using the intrinsically unstructured/disordered region/domain prediction method, the candidate protein can be subjected to step (B) of evaluating the stability, based on the amino acid sequence information and base sequence information on the candidate protein. When step (A) is carried out by the analysis based on heat solubility, the obtained candidate protein can be subjected, as it is, to step (B) of evaluating the stability. However, when two or more candidate proteins are obtained through the analysis based on heat solubility as performed in step (A), the individual candidate proteins are identified, for example, by mass spectrometry or the like from the viewpoint of distinguishing their respective characteristics, and, based on the identification information, the candidate proteins can be subjected to step (B) of evaluating the stability.

<<Agent for Stabilizing Physiologically Active Protein and Pharmaceutical Composition>>

As will be described in the following Examples, the screening method of the present invention was carried out, so that proteins having amino acid sequences of SEQ ID NOs: 1 to 6 were identified as proteins protecting a physiologically active protein from stress. Therefore, according to another aspect of the present invention, an agent for stabilizing a physiologically active protein comprising, as an active ingredient, (a) a protein having any one of amino acid sequences of SEQ ID NOs: 1 to 6 (hereinafter referred to as "stabilizing protein of the present invention") is provided. The stabilizing agent of the present invention can be used as an agent for stabilizing a medicine comprising a physiologically active protein as an active ingredient.

As will be described in the following Examples, Hero proteins having a shuffled amino acid sequence while maintaining the amino acid residue composition ratio and fragments of the Hero proteins were observed to have an activity to protect the client protein, similarly to the original Hero proteins. Therefore, in the present invention, in addition to the (a) protein having any one of amino acid sequences of SEQ ID NOs: 1 to 6, the proteins (b), (c), (d) and (e) described above are encompassed in the stabilizing protein of the present invention. The proteins (b), (c), (d) and (e) described above may be non-naturally occurring proteins or proteins of mammalian (preferably, human) origin.

In the present invention, the "shuffle" of an amino acid sequence means that the arrangement order is randomly changed while the composition ratio of amino acid residues constituting the original amino acid sequence is maintained. The (b) protein having an amino acid sequence obtained by shuffling any one of amino acid sequences of SEQ ID NOs: 1 to 6 means a protein having an amino acid sequence in which the arrangement order is randomly changed while maintaining the composition ratio of amino acid residues constituting the original amino acid sequence. For the composition ratios of the amino acid residues of the Hero proteins, reference can be made to Tables 1 to 6 which will be indicated below. The protein (b) maintains the number of amino acid residues of the original amino acid sequence, and thus, in other words, can be a protein having an amino acid sequence in which the arrangement order is randomly changed while maintaining the number and types of amino acid residues of any one of the amino acid sequences of SEQ ID NOs: 1 to 6. Amino acid sequence shuffling can be performed by using a known technique, and, for example, software for generating random protein sequences (for example, Random protein sequence generator, RandSeq) can be used to obtain a shuffled amino acid sequence. When the obtained shuffled amino acid sequence is given, a protein having the amino acid sequence can be synthesized according to a technique such as a known peptide synthesis method. The protein (b) can be defined as having the activity to stabilize a physiologically active protein.

The protein (c) described above is a protein having a fragment sequence of any one of amino acid sequences of SEQ ID NOs: 1 to 6. The protein means a protein having an arbitrary fragment sequence of the original amino acid sequence. The amino acid residue length of the fragment sequence can be defined as one-third or more (33% or more) of the overall amino acid residue length of the original amino acid sequence, preferably two-fifths or more (40% or more), one-half or more (50% or more), two-thirds or more (67% or more), three-quarters or more (75% or more) or four-fifths or more (80% or more) of the overall amino acid residue length. The lower limit value of the amino acid residue length of the fragment sequence can be, for example, 43 amino acid residues, 50 amino acid residues, 60 amino acid residues, 70 amino acid residues, 80 amino acid residues, or 90 amino acid residues. The protein (c) can be defined as having the activity to stabilize a physiologically active protein.

The protein (d) described above is a protein which satisfies an amino acid residue composition ratio of a Hero protein and has an amino acid sequence having a length of 43 amino acid residues or more. The arrangement order of the amino acid residues is not limited as long as the protein satisfies the amino acid residue composition ratio of the original amino acid sequence and has a predetermined amino acid residue length. The lower limit value of the amino acid residue length of the amino acid sequence can be, for example, 43 amino acid residues, 50 amino acid residues, 60 amino acid residues, 70 amino acid residues, 80 amino acid residues, or 90 amino acid residues, and the upper limit value thereof can be, for example, 5000 amino acid residues, 2000 amino acid residues, 1000 amino acid residues, 700 amino acid residues, 500 amino acid residues, 408 amino acid residues, 300 amino acid residues, 200 amino acid residues, or 110 amino acid residues. These lower limit values and upper limit values can be arbitrarily combined, and the amino acid sequence of the protein (d) described above can be, for example, a length of 50 to 1000 amino acid residues, 70 to 700 amino acid residues, or 90 to 500 amino acid residues.

The amino acid residue composition ratios of Hero proteins defined in the protein (d) are as follows. When the protein (d) is specified by the amino acid residue composition ratio, the amino acid residue composition ratios indicated in Tables 1 to 6 below each include a range of ±5% (preferably, ±4%, ±3%, ±2%, ±1% or ±0.5%) thereof. For example, in the amino acid residue composition ratio of Hero7 (Table 1), the composition ratio of Arg can be in the range of ±5% of 11.9%, that is, 6.9% to 16.9%.

[Table 1]

TABLE 1

Amino acid residue composition ratio of Hero7 (SEQ ID NO: 1)

|  | Amino acid | Composition ratio (%) |
|---|---|---|
| Basic amino acid | Arg | 11.9 |
|  | His | 0.0 |
|  | Lys | 20.3 |
| Acidic amino acid | Asp | 6.8 |
|  | Glu | 8.5 |
| Polar amino acid (neutral amino acid) | Asn | 5.1 |
|  | Cys | 0.0 |
|  | Gln | 11.9 |
|  | Gly | 5.1 |
|  | Ser | 6.8 |
|  | Thr | 1.7 |
|  | Tyr | 0.0 |
| Non-polar amino acid (hydrophobic amino acid) | Ala | 8.5 |
|  | Ile | 1.7 |
|  | Leu | 3.4 |
|  | Met | 5.1 |
|  | Phe | 0.0 |
|  | Pro | 1.7 |
|  | Trp | 0.0 |
|  | Val | 1.7 |

[Table 2]

TABLE 2

Amino acid residue composition ratio of Hero11 (SEQ ID NO: 3)

|  | Amino acid | Composition ratio (%) |
|---|---|---|
| Basic amino acid | Arg | 6.1 |
|  | His | 2.0 |
|  | Lys | 21.2 |
| Acidic amino acid | Asp | 1.0 |
|  | Glu | 3.0 |
| Polar amino acid (neutral amino acid) | Asn | 2.0 |
|  | Cys | 0.0 |
|  | Gln | 6.1 |
|  | Gly | 6.1 |
|  | Ser | 8.1 |
|  | Thr | 3.0 |
|  | Tyr | 0.0 |
| Non-polar amino acid (hydrophobic amino acid) | Ala | 17.2 |
|  | Ile | 3.0 |
|  | Leu | 6.1 |
|  | Met | 2.0 |
|  | Phe | 1.0 |
|  | Pro | 6.1 |
|  | Trp | 0.0 |
|  | Val | 6.1 |

[Table 3]

TABLE 3

Amino acid residue composition ratio of Hero45 (SEQ ID NO: 6)

|  | Amino acid | Composition ratio (%) |
|---|---|---|
| Basic amino acid | Arg | 9.8 |
|  | His | 2.7 |
|  | Lys | 8.6 |
| Acidic amino acid | Asp | 7.4 |
|  | Glu | 10.3 |
| Polar amino acid (neutral amino acid) | Asn | 3.9 |
|  | Cys | 0.2 |
|  | Gln | 3.9 |
|  | Gly | 13.8 |
|  | Ser | 6.6 |
|  | Thr | 2.7 |
|  | Tyr | 1.0 |

TABLE 3-continued

Amino acid residue composition ratio of Hero45 (SEQ ID NO: 6)

| | Amino acid | Composition ratio (%) |
|---|---|---|
| Non-polar amino acid (hydrophobic amino acid) | Ala | 5.9 |
| | Ile | 2.9 |
| | Leu | 4.2 |
| | Met | 0.7 |
| | Phe | 3.4 |
| | Pro | 6.4 |
| | Trp | 0.7 |
| | Val | 4.7 |

[Table 4]

TABLE 4

Amino acid residue composition ratio of Hero9 (SEQ ID NO: 2)

| | Amino acid | Composition ratio (%) |
|---|---|---|
| Basic amino acid | Arg | 3.6 |
| | His | 3.6 |
| | Lys | 1.2 |
| Acidic amino acid | Asp | 7.2 |
| | Glu | 14.5 |
| Polar amino acid (neutral amino acid) | Asn | 6.0 |
| | Cys | 1.2 |
| | Gln | 7.2 |
| | Gly | 9.6 |
| | Ser | 7.2 |
| | Thr | 1.2 |
| | Tyr | 1.2 |
| Non-polar amino acid (hydrophobic amino acid) | Ala | 9.6 |
| | Ile | 2.4 |
| | Leu | 12.0 |
| | Met | 3.6 |
| | Phe | 2.4 |
| | Pro | 4.8 |
| | Trp | 0.0 |
| | Val | 1.2 |

[Table 5]

TABLE 5

Amino acid residue composition ratio of Hero13 (SEQ ID NO: 4)

| | Amino acid | Composition ratio (%) |
|---|---|---|
| Basic amino acid | Arg | 4.9 |
| | His | 4.4 |
| | Lys | 8.7 |
| Acidic amino acid | Asp | 13.7 |
| | Glu | 13.1 |
| Polar amino acid (neutral amino acid) | Asn | 2.7 |
| | Cys | 0.5 |
| | Gln | 2.7 |
| | Gly | 8.2 |
| | Ser | 13.1 |
| | Thr | 1.6 |
| | Tyr | 1.6 |
| Non-polar amino acid (hydrophobic amino acid) | Ala | 6.0 |
| | Ile | 1.1 |
| | Leu | 4.9 |
| | Met | 2.7 |
| | Phe | 2.2 |
| | Pro | 3.8 |
| | Trp | 0.5 |
| | Val | 3.3 |

[Table 6]

TABLE 6

Amino acid residue composition ratio of Hero20 (SEQ ID NO: 5)

| | Amino acid | Composition ratio (%) |
|---|---|---|
| Basic amino acid | Arg | 11.7 |
| | His | 5.4 |
| | Lys | 0.9 |
| Acidic amino acid | Asp | 6.3 |
| | Glu | 12.6 |
| Polar amino acid (neutral amino acid) | Asn | 8.1 |
| | Cys | 1.8 |
| | Gln | 6.3 |
| | Gly | 10.8 |
| | Ser | 0.9 |
| | Thr | 0.0 |
| | Tyr | 0.0 |
| Non-polar amino acid (hydrophobic amino acid) | Ala | 4.5 |
| | Ile | 5.4 |
| | Leu | 8.1 |
| | Met | 8.1 |
| | Phe | 2.7 |
| | Pro | 5.4 |
| | Trp | 0.9 |
| | Val | 0.0 |

The protein (d) can be defined as having the activity to stabilize a physiologically active protein. As a specific embodiment of the protein (d), the protein (b) is indicated.

In the present invention, in addition to the proteins (a), (b), (c) and (d) described above, a protein substantially identical with the protein (a), (b), (c) or (d) (protein (e)) is also encompassed in the stabilizing protein of the present invention. The substantially identical protein is a protein selected from the group consisting of the above (i) to (v).

In the above (i), the meaning of the "identity" includes "homology." The "identity" is, for example, a degree of identity when sequences to be compared are appropriately aligned (alignment), and means an occurrence rate (%) of accurate match in amino acids between the sequences. For the identity, the presence of a gap and the natures of the amino acids in the sequences, for example, are taken into account (Wilbur, Natl. Acad. Sci. U.S.A. 80:726-730 (1983)). The alignment can be performed, for example, by using an arbitrary algorithm, and, specifically, homology search software such as BLAST (Basic local alignment search tool) (Altschul et al., J. Mol. Biol. 215:403-410 (1990)), FASTA (Peasron et al., Methods in Enzymology 183:63-69 (1990)), and Smith-Waterman (Meth. Enzym., 164, 765 (1988)) can be used. In addition, the identity can be calculated, for example, by using a known homology search program as described above, and can be calculated, for example, by using the default parameters in the homology algorithm BLAST (https://blast.ncbi.nlm.nih.gov/Blast.cgi) of the National Center for Biotechnology Information (NCBI).

The identity in the above (i) is, for example, 80% or more, 85% or more, 90% or more, 95% or more, 96% or more, 97% or more, 98% or more, or 99% or more.

In the above (ii), the phrase "one or more amino acid(s) is/are deleted, substituted, inserted and/or added in the amino acid sequence" means that a number of amino acids produced by a known method such as site mutagenesis or a number of naturally occurring amino acids have been modified by deletion, substitution, insertion and/or addition. The number of amino acids modified by the substitution and/or the like is, for example, 1 to 20, 1 to 10, 1 to 5, 1 to 4, 1 to 3, 1 to 2, or 1. In the amino acid sequence, the modifications may occur continuously or discontinuously, for example.

Examples of the insertion of amino acids in the above (ii) include insertion into the amino acid sequence. Further, the addition of amino acids in the above (ii) may be, for example, addition to the N-terminal or C-terminal of the amino acid sequence, or addition to both the N-terminal and the C-terminal thereof.

The substitution of amino acids in the above (ii) means that amino acid residues constituting the amino acid sequence are replaced with other types of amino acid residues. The substitution of amino acids in the above (ii) may be, for example, conservative substitution. The "conservative substitution" means substituting one or more amino acid(s) with another/other amino acid(s) and/or amino acid derivative(s) so as not to substantially modify the function of the protein. In the conservative substitution, the amino acid to be substituted and the amino acid after the substitution are preferably similar in nature and/or function, for example. Specifically, they are preferably similar in chemical properties such as hydrophobicity and hydrophilicity indexes, polarity and charge, or physical properties such as secondary structure. Such amino acids or amino acid derivatives similar in nature and/or function are known in the technical field. Examples of non-polar amino acids (hydrophobic amino acids) include alanine, valine, isoleucine, leucine, proline, tryptophan, phenylalanine, and methionine. Examples of polar amino acids (neutral amino acids) include glycine, serine, threonine, tyrosine, glutamine, asparagine, and cysteine. Examples of positively charged amino acids (basic amino acids) include arginine, histidine, and lysine, and examples of negatively charged amino acids (acidic amino acids) include aspartic acid and glutamic acid.

The "base sequence encoding the amino acid sequence" in the above (iii), (iv) and (v) can be specified based on the genetic code (that is, codon) when a specific amino acid sequence is given.

The "amino acid sequence encoded by a base sequence" and the "amino acid sequence encoded by a polynucleotide" in the above (iii), (iv) and (v) can be specified based on the genetic code (that is, codon) when a specific base sequence or a specific polynucleotide having a specific base sequence is given.

In the above (iii), the meaning of the "identity" includes "homology." The "identity" is, for example, a degree of identity when sequences to be compared are appropriately aligned (alignment), and means an occurrence rate (%) of accurate match in amino acids between the sequences, as described in the above (i). For the identity, the presence of a gap and the natures of the bases in the sequences, for example, are taken into account (Wilbur, Natl. Acad. Sci. U.S.A. 80:726-730(1983)). The alignment can be performed, for example, by using an arbitrary algorithm, and, for example, homology search software such as BLAST, FASTA and Smith-Waterman can be used. In addition, the identity can be calculated, for example, by using a known homology search program as described above, and can be calculated, for example, by using the default parameters in the homology algorithm BLAST.

The identity in the above (iii) is, for example, 80% or more, 85% or more, 90% or more, 95% or more, 96% or more, 97% or more, 98% or more, or 99% or more.

In the above (iv), the phrase "one or more base(s) is/are deleted, substituted, inserted and/or added in the base sequence" means that a number of bases (nucleotides) produced by a known method such as site mutagenesis or a number of naturally occurring bases have been modified by deletion, substitution, insertion and/or addition. The number of bases modified by the substitution and/or the like is, for example, 1 to 50, 1 to 20, 1 to 10, 1 to 6, 1 to several, 1 to 3, 1 to 2, or 1. For example, the bases to be deleted, inserted and/or added as described above are preferably a codon consisting of continuous three bases. The number of codons is, for example, 1 to 20, 1 to 10, 1 to 5, 1 to 4, 1 to 3, 1 to 2, or 1. In the base sequence, the modifications may occur continuously or discontinuously.

Examples of the insertion of bases in the above (iv) include insertion into the base sequence. Further, the addition of bases in the above (iv) may be, for example, addition to the 5'-terminal or 3'-terminal of the base sequence, or addition to both the 5'-terminal and the 3'-terminal thereof.

In the above (v), the "hybridize" means that a certain polynucleotide forms a double strand with the target polynucleotide by hydrogen bonds between their respective complementary bases. The "hybridize" can be detected by various hybridization assays. Examples of hybridization assays include known methods such as a Southern hybridization assay and a colony hybridization assay.

In the above (v), the "hybridize" or "hybridization" can be performed under stringent conditions, and, for example, can be carried out by performing a hybridization reaction in a hybridization buffer, and then washing the resultant product with a washing buffer. Here, the "stringent conditions" can be determined depending on Tm (° C.) of the double strand of a certain base sequence and its complementary strand, the required salt concentration and the like, and it is a well-known technique to those skilled in the art to select a base sequence encoding an amino acid sequence and then to set stringent conditions corresponding to the selected base sequence (see, for example, J. Sambrook, E. F. Frisch, T. Maniatis; Molecular Cloning 2nd edition, Cold Spring Harbor Laboratory (1989)). For example, the stringent conditions are as follows: the hybridization reaction is performed in a suitable buffer commonly used for hybridization (e.g., an SSC solution) at a temperature slightly lower than Tm as determined by the base sequence (e.g., a temperature 0 to 5° C. lower than Tm or a temperature 0 to 2° C. lower than Tm). Further, the stringent conditions are, for example, as follows: washing after the hybridization reaction is performed with a high-concentration, low-salt-concentration solution.

In the present invention, the "activity to stabilize a physiologically active protein" is an activity to stabilize a physiologically active protein which is the client protein. Therefore, whether a protein is the "protein having an activity to stabilize a physiologically active protein" can be determined, for example, by subjecting the candidate protein to a protective effect confirmation test and an aggregation suppressive effect confirmation test as will be described in the following Examples and assessing these effects of the candidate protein.

Moreover, according to still another aspect of the present invention, a pharmaceutical composition comprising one or more stabilizing proteins of the present invention is provided. The pharmaceutical composition of the present invention may comprise a physiologically active protein as an active ingredient, and the stabilizing protein of the present invention acts as an agent for stabilizing the active ingredient. That is, the pharmaceutical composition of the present invention can comprise the stabilizing protein of the present invention in an amount effective in stabilizing the active ingredient.

The pharmaceutical composition of the present invention may further comprise a pharmaceutically acceptable additive for formulations. Additives for formulations suitable for a formulation form are obvious to those skilled in the art and can be appropriately selected according to the formulation form. The formulation form of the pharmaceutical composition of the present invention is not particularly limited, and can be an arbitrary formulation form such as a liquid formulation or a solid formulation, but is preferably a liquid formulation.

In the pharmaceutical composition of the present invention, the physiologically active protein may be provided in an embodiment conjugated to the stabilizing protein of the present invention. Preferably, the physiologically active protein may be provided in a form such that it is fused to the stabilizing protein of the present invention by genetic engineering. Conjugation or genetic engineering fusion of the stabilizing protein of the present invention can be carried out by a known means. Further, only one stabilizing protein of the present invention may be conjugated or fused, or a plurality of stabilized proteins may be conjugated or fused (for example, in tandem or in a scattered form). The stabilizing protein(s) may be conjugated or fused to a terminal or the inside of the physiologically active protein.

According to still another aspect of the present invention, there is provided a method for stabilizing a physiologically active protein, comprising the step of contacting a protein selected from the group consisting of the proteins (a), (b), (c), (d) and (e) described above and a physiologically active protein. The stabilizing method of the present invention can be carried out in accordance with the descriptions about the screening method of the present invention, the stabilizing agent of the present invention and the pharmaceutical composition of the present invention.

According to yet another aspect of the present invention, there is provided use of a protein selected from the group consisting of the proteins (a), (b), (c), (d) and (e) described above for the manufacture of an agent for stabilizing a physiologically active protein, as an agent for stabilizing a physiologically active protein, or for stabilizing a physiologically active protein. The use of the present invention can be carried out in accordance with the descriptions about the screening method of the present invention, the stabilizing agent of the present invention and the pharmaceutical composition of the present invention.

The methods and uses of the present invention can be carried out in a non-therapeutic mode. The "non-therapeutic" means elimination of operating, treating or diagnosing activities to a human (i.e., medical activities to a human), and specifically means elimination of a method of performing operation or treatment of, or diagnosis involving, a human by a doctor or a person who receives an instruction from the doctor.

EXAMPLES

The present invention will be described in more detail based on the following examples, but is not limited to these examples.

Example 1: Analysis of Influence of Boiled Supernatant on Client Protein (1) General Method

*Drosophila* S2 cells were cultured at 27° C. in Schneider's *Drosophila* Medium (manufactured by Gibco) supplemented with 10% fetal bovine serum (manufactured by Gibco) and Antibiotic-Antimycotic (manufactured by Gibco) (the same applies to the following examples). HEK293T cells were maintained in Dulbecco's Modified Eagle Medium (manufactured by Sigma) supplemented with 10% FBS in a 5% $CO_2$ atmosphere at 37° C. (the same applies to the following examples).

A lysis buffer (30 mM HEPES-KOH pH 7.4, 100 mM KOAc, and 2 mM Mg(OAc)$_2$), a wash buffer (a lysis buffer containing 1% Triton X-100 and 800 mM NaCl), and a hypotonic lysis buffer (10 mM HEPES-KOH pH 7.4, 10 mM KOAc, 1.5 mM Mg(OAc)$_2$, 1× complete EDTA-free Protease Inhibitor Cocktail (manufactured by Roche), and 5 mM DTT) were used to prepare a cell lysate (the same applies to the following examples).

To prepare lysates from S2 cells or HEK293T cells, the cells were collected and washed once with PBS. The cell pellets were resuspended with an equal volume of a hypotonic lysis buffer, incubated for 15 minutes, vortexed for 15 seconds, and centrifuged at 17,000 g for 20 minutes. The supernatant was collected into tubes, rapidly frozen in liquid nitrogen, and stored at −80° C. For boiling, the lysates were heated at 95° C. for 15 minutes, kept on ice for 1 minute, then centrifuged at 20,000 g for 5 minutes to remove aggregation (the same applies to the following examples).

(2) Client Protein (Argonaute) Elution Assay a. Plasmid Construction pCAGEN-FlagTevSnap-DEST was prepared as follows: a DNA fragment containing an N-terminal FLAG tag, a TEV protease recognition sequence and a SNAP tag, followed by Gateway attR sites was inserted into pCAGEN using NEBuilder HiFi DNA Assembly Master Mix (manufactured by NEB). pCAGEN-FlagTevSnap-Ago2 (wild type) was prepared as follows: a DNA fragment containing a codon-optimized *Drosophila* Ago2 CDS sequence in pENTR/D-Ago2 (K. Tsuboyama, H. Tadakuma, Y. Tomari, Mol. Cell. 70, 722-729.e4 (2018)) was inserted into pCAGEN-FlagTevSnap-DEST using Gateway LR Clonase (manufactured by Invitrogen).

B. Method

FLAG-TEV-SNAP-Ago2 expressed in HEK293T cells was labeled with SNAP-Surface Alexa Fluor 647 (manufactured by NEB) and immunopurified by an anti-FLAG antibody conjugated onto Dynabeads Protein G (manufactured by Invitrogen). The beads were washed three times with a wash buffer, three times with a wash buffer containing 2 mM ATP, and rinsed with a lysis buffer. The beads were incubated with a lysis buffer, crude lysates, or their boiled supernatants containing 2 U/µL TurboTEV protease (manufactured by Accelagen) at room temperature for 1 hour. To prepare proteinase K-treated supernatants, the supernatants were mixed with 2 mg/mL proteinase K, incubated at 37° C. for 1 hour, and reboiled at 95° C. for 15 minutes to deactivate the proteinase K. The red fluorescent dye covalently bonded to the SNAP tag was detected by a chemiluminescence detection method using Lumine Forte Western HRP Substrate (manufactured by Millipore). An image was acquired by Amersham Imager 600 (manufactured by GE Healthcare).

C. Result

The results were as shown in FIG. 1B. During the course of studies on Argonaute (Ago2) protein, a strange phenomenon was observed (FIG. 1B): when *Drosophila* Ago2 was fused with a TEV protease-cleavable FLAG tag and immunopurified using anti-FLAG magnetic beads (see FIG. 1A), the Ago2 protein could not be eluted from the beads, even after the FLAG tag was removed using the TEV protease. From this, it was considered that purified, free Ago2 protein is unstable and tends to adhere nonspecifically to the beads. Strikingly, addition of the crude *Drosophila* S2 cell lysate during the TEV protease treatment promoted efficient elution of Ago2. To verify whether protein(s) was/were responsible for this effect, the crude S2 cell lysate was boiled at 95° C. for 15 minutes, and the precipitated proteins were removed by centrifugation. The supernatant of the heat-denatured lysate, which contained only about 4.3% of the total protein concentration in the crude cell lysate, was as competent in eluting Ago2 as the original lysate. Digestion of the boiled supernatant with proteinase K (PK), followed by its inactivation by a second round of heating, halved its activity in Ago2 elution. It was confirmed that the elution of *Drosophila* Ago2 was similarly promoted by the crude lysate from human HEK293T cells and its boiled supernatant (about 6% of the original protein concentration), and that the elution efficiency was halved through the proteinase K treatment. These results showed that some heat-soluble proteins contained in the boiled supernatants of the crude S2 cell or HEK293T cell lysate promote elution of free Ago2 from the beads.

(3) Small RNA Pull-Down Assay a. Plasmid Construction pCold-Hsc70-4, Hsp83, Hop, Droj2 and p23 are described in S. Iwasaki et al., Nature. 521, 533-536 (2015). pCAGEN-FlagTevSnap-Ago2 (wild type) was prepared in accordance with the description in the above (2)A. pCAGEN-Flag-GST was prepared by inserting a DNA fragment containing GST with an N-terminal FLAG tag into pCAGEN using NEBuilder HiFi DNA Assembly Master Mix (manufactured by NEB).

B. Protein Purification

Recombinant proteins of Hsc70-4, Hsp83, Hop, Droj2, p23 and Dicer-2/R2D2 heterodimer were expressed and purified as described previously (S. Iwasaki et al., Nature. 521, 533-536 (2015)).

C. Method

Small molecular RNA pull-down to detect pre-Ago2-RISC (RNA-induced silencing complex, RISC) and mature Ago2-RISC formation was performed as described in Z. Dosztanyi, V. Csizmok, P. Tompa, I. Simon, J. Mol. Biol. 347, 827-839 (2005) with slight modifications. FLAG-TEV-Halo-Ago2 expressed in S2 cells was immunopurified by an anti-FLAG antibody conjugated onto Dynabeads Protein G (manufactured by Invitrogen). The beads were washed three times with a wash buffer, three times with a wash buffer containing 2 mM ATP, and finally rinsed with a lysis buffer. The Ago2-conjugated beads were then incubated with the reconstitution system, $^{32}$P-radiolabeled small RNA duplex, ATP regeneration system (1 mM ATP, 25 mM creatine monophosphate (manufactured by Sigma), 0.03 U/μL creatine kinase (manufactured by Calbiochem), and 0.1 U/μL RNasin Plus RNase Inhibitor (manufactured by Promega)) and 3.5 μL of each boiled supernatant in 10 μL lysis buffer at 25° C. for 60 minutes. The reconstitution system contained 20 nM Dicer-2/R2D2, 600 nM Droj2, 1.8 μM Hsc70-4, 1.5 μM Hop, 3 μM Hsp83, and 3 μM p23. In every case, the total protein concentration was adjusted by the supplementation of glutathione S-transferase (referred to simply as "GST" herein). After incubation, beads were washed four times with a wash buffer, then bound RNAs were extracted by proteinase K treatment and analyzed by native PAGE.

D. Result

Figure 2:
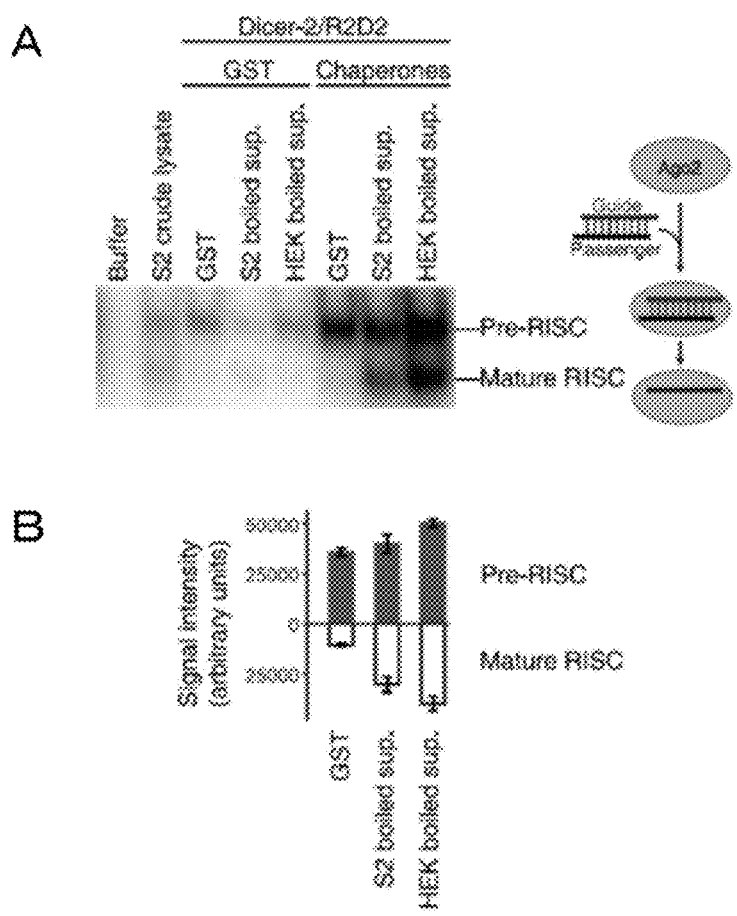
FIG. 2 shows that heat-soluble proteins improve the molecular behavior of *Drosophila* Argonaute 2 (Ago2) protein in vitro. (A) A small RNA pull-down assay for pre-Ago2-RISC and mature Ago2-RISC assembled in the reconstitution system, containing a $^{32}$P-radiolabeled small RNA duplex, Ago2, Dicer-2/R2D2, and Hsp70/Hsp90 chaperone machinery. Addition of the boiled supernatant from S2 cells or HEK293T cells promoted formation of both pre-Ago2-RISC and mature Ago2-RISC. (B) shows the quantified results of the assay (A). Data represent means±SD from three independent experiments.

The results were as shown in FIGS. 2A and 2B. Assembly of *Drosophila* Ago2-RISC requires not only a small RNA duplex and Ago2 itself but also the Dicer-2/R2D2 heterodimer and the Hsp70/90 chaperone machinery (S. Iwasaki et al., Nature. 521, 533-536 (2015)). It was confirmed that all these factors were present in the crude S2 cell lysate, and that incubation of the FLAG-tagged Ago2 immobilized on the magnetic beads with the $^{32}$P-radiolabeled small RNA duplex and the S2 cell lysate efficiently assembled pre-RISC, containing both strands of the duplex, and mature RISC, containing only the single-stranded guide. Compared to the crude S2 lysate, reconstitution of an Ago2-RISC assembly using high concentrations of purified Hsp70/90 chaperone machinery and Dicer-2/R2D2 efficiently formed pre-Ago2-RISC, but its conversion into mature Ago2-RISC was inefficient. Adding the supernatants of heat-denatured S2 or HEK293T cell lysates in the presence of chaperones strongly promoted the formation of both pre-Ago2-RISC and mature Ago2-RISC, although, without the chaperones, the supernatants themselves showed no reconstitution activity. Thus, the boiled supernatants from either *Drosophila* S2 or human HEK293T cells can promote the assembly of Ago2-RISC by Dicer-2/R2D2 and the chaperone machinery. These results showed that factors in the boiled supernatants improve the molecular behavior of Ago2, either in its free form (FIGS. 1A and 1B) or upon RISC assembly (FIGS. 1C and 1D), beyond the species boundary.

(4) Effect for Protecting Client Protein (Lactate Dehydrogenase) from Desiccation A. Method Purified lactate dehydrogenase (LDH) derived from rabbit muscle (manufactured by Roche) was diluted to 5 μg/mL in 5-fold diluted boiled supernatants from S2 cells or HEK293T cells. Samples were desiccated in SpeedVac vacuum concentrator (manufactured by Thermo) for 16 hours without heating. For normalization, the same amount of LDH under the same conditions was kept on ice for the same duration as desiccation. Dried samples were rehydrated by PBS, and the LDH activity was measured by using Cytotoxicity LDH Assay Kit-WST (manufactured by Dojindo Laboratories).

B. Result

Figure 3:
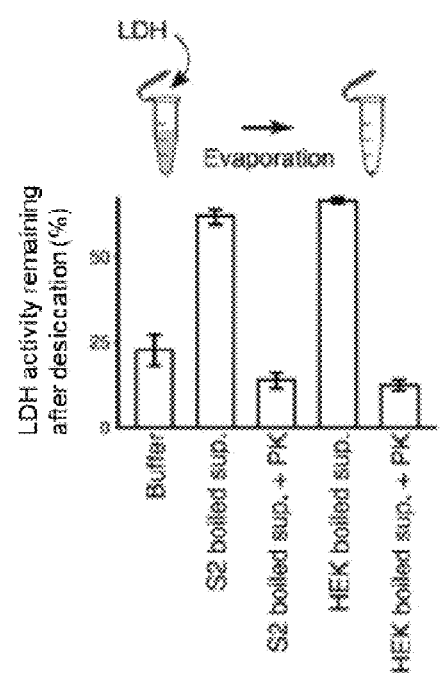
FIG. 3 shows that heat-soluble proteins improve the activity of lactate dehydrogenase (LDH) when condensed after desiccation of *Drosophila* Argonaute 2 (Ago2) protein in vitro. The heat-soluble proteins in the boiled supernatants protect the lactate dehydrogenase (LDH) activity from desiccation. LDH mixed with the boiled supernatants or buffer was dried up overnight and the remaining LDH activities were measured. Data are normalized to the activity of LDH incubated on ice overnight and represent means±SD from three independent experiments.

The results were as shown in FIG. 3. It was confirmed that, when purified lactate dehydrogenase (LDH) derived from rabbit muscle was dried up at room temperature overnight, its activity was reduced to about 20% of the original level, but that the boiled supernatants from S2 or HEK293T cells were added before desiccation, so that about 60 to 70% of the LDH activity was maintained. The effect was deteriorated by proteinase K treatment of the supernatants, demonstrating that heat-soluble *Drosophila* and human proteins can protect the activity of LDH from desiccation.

Example 2: Identification of Soluble Protein Contained in Boiled Crude Cell Lysate (1) Method A. Identification of Heat-Soluble Protein by Mass Spectrometry Heat generally denatures protein structures by exposing hydrophobic regions. Thus, proteins remaining soluble in the boiled supernatant are highly likely to be hydrophilic and intrinsically disordered. To test this idea, the *Drosophila* S2 cell and human HEK293T cell lysates and their boiled supernatants were subjected to LC-MS/MS analysis to identify proteins. Specifically, mass spectrometry was conducted in the following manner.

Proteins in the crude lysates and their boiled supernatants were trypsinized. LTQ-Orbitrap Velos mass spectrometer (manufactured by Thermo Fisher Scientific) coupled with Dina-2A nanoflow LC system (manufactured by KYA Technologies) was used to perform nano liquid chromatography tandem mass spectrometry (nano LC-MS/MS) analysis according to a routine method. In order to analyze the relative amino acid frequency of the identified heat-soluble proteins, the MS/MS signals were processed against the UniProt human proteome (*Homo sapiens*; UP000005640) and *Drosophila* proteome (*Drosophila melanogaster*; UP000000803) using the Mascot algorithm (version 2.5.1; Matrix Science). The proteins were identified based on a Mascot score beyond the threshold value (false discovery rate [FDR]<0.01). One (1) was added to all the peptide spectrum match (PSM) values (to avoid zeros), which correlate with the protein amount, and the ratio between (PSM+1) in the original crude lysate and that in the boiled supernatants was calculated. Next, the identified proteins were divided into five groups according to the degrees of depletion or enrichment by boiling (Group I [most depleted] to Group V [most enriched]), in such a way that each group contained virtually the same number of proteins. The respective groups contained virtually the same number of proteins according to the degrees of enrichment or depletion by boiling.

B. Prediction of Structurally Disordered Domain

To examine the overall characteristics of the proteins identified in the above (1), IUPred (Z. Dosztanyi, V. Csizmok, P. Tompa, I. Simon, J. Mol. Biol. 347, 827-839 (2005)), which is a prediction method for Intrinsically disordered Regions (IDRs), was utilized. A score of 0.5 or more in IUPred indicates that the amino acid residue at a given position is highly likely to be a part of a disordered region (Z. Dosztanyi, V. Csizmok, P. Tompa, I. Simon, J. Mol. Biol. 347, 827-839 (2005)). Specifically, the degree of disorder was predicted in the following manner.

Amino acid sequences were collected from the UniProt human proteome (*Homo Sapiens*; UP000005640) and *Drosophila* proteome (*Drosophila melanogaster*; UP000000803). Also, the amino acid sequences of the proteins identified in the above (1) were used. These sequences were subjected to the IUPred method. The median of IUPred scores of all the amino acid residues was allocated for each protein, and their distributions were plotted as violin plots.

C. Ortholog Prediction

Ortholog prediction was performed by DIOPT, DRSC (*Drosophila* RNAi Screening Center) Integrative Ortholog Prediction Tool. The scores of best matched proteins between *Drosophila* flies and humans were plotted.

(2) Result

Figure 4:
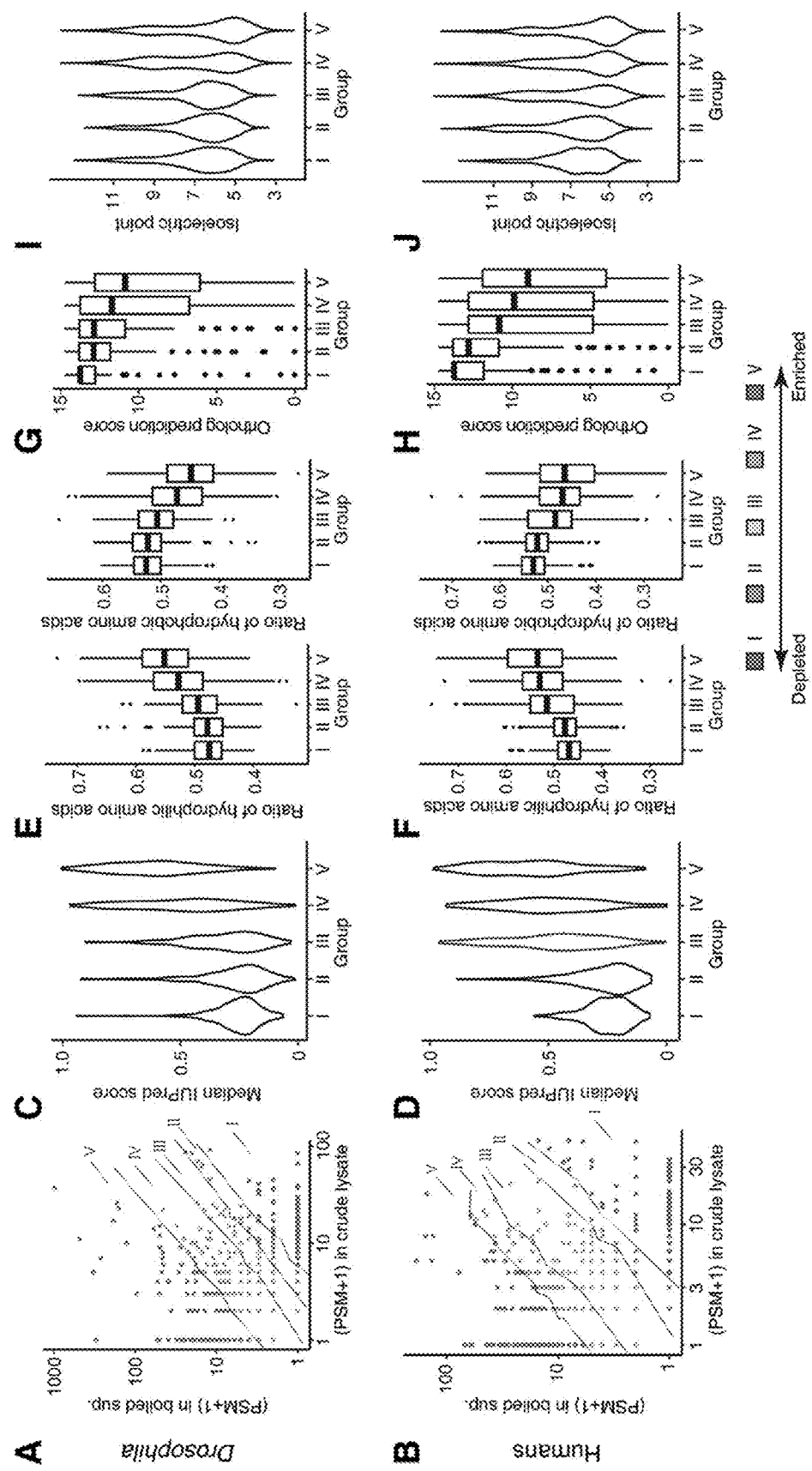
FIG. 4 shows that hydrophilic and highly charged proteins are enriched in boiled supernatants. (A and B) show, for the proteins identified, by MS analysis, in *Drosophila*- and human-derived cell lysates, distributions of a ratio between the peptide spectrum match (PSM)+1 in the original crude lysate and that in the boiled supernatants. The identified proteins were divided into five groups according to the degrees of depletion by boiling or enrichment by boiling (Groups I to V), in such a way that each group contained virtually the same number of proteins. (C and D) Distributions of medians of IUPred scores of the proteins belonging to Groups I to V. The width of each group indicates a proportion (or a relative value) of the protein. (E and F) Proportions of hydrophilic amino acids or hydrophobic amino acids of the proteins belonging to Groups I to V. (G and H) Distributions of DIOPT (DRSC Integrative Ortholog Prediction Tool) scores of the proteins belonging to Groups I to V. (I and J) Distributions of isoelectric points of the proteins of Groups I to V. The width of each group indicates a proportion (or a relative value) of the protein.

The results were as shown in FIG. 4. The *Drosophila* S2 cell and human HEK293T cell lysates and their boiled supernatants were subjected to LC-MS/MS analysis to identify 910 proteins for S2 cells and 980 proteins for HEK293T cells with high confidence (FDR [false discovery rate] <0.01). The identified proteins were divided into five groups according to the degrees of depletion or enrichment by boiling (Group I [most depleted] to Group V [most enriched]), in such a way that each group contained virtually the same number of proteins (FIGS. 4A and 4B). The proteins enriched by boiling showed much higher distributions of the median of IUPred scores than the proteins depleted by boiling in both *Drosophila* flies or humans (FIGS. 4C and 4D). Moreover, hydrophilic amino acids were overrepresented, while hydrophobic amino acids were underrepresented, in the proteins enriched by boiling (FIGS. 4E and 4F). Thus, structurally disordered, hydrophilic proteins were enriched in the boiled supernatant. Motifs associated with LEA proteins were not found among the proteins identified in the boiled supernatants. No common or conserved motifs were detected among the primary sequences of the identified proteins. Moreover, the DIOPT (DRSC Integrative Ortholog Prediction Tool) score, which integrates 15 different ortholog prediction tools for the comparison between *Drosophila* flies and humans, was gradually decreased as the enrichment by boiling was increased, demonstrating that heat-soluble proteins are evolutionarily less conserved in their primary amino acid sequences than regular heat-vulnerable proteins (FIGS. 4G and 4H). These results suggested that heat-soluble proteins, as a whole, cannot be defined by conventional, sequence- and homology-based classifications. The isoelectric points (pIs) of the proteins enriched by boiling exhibited a bimodal distribution, concentrating on the acidic (about pH 5) or basic (about pH 10) region and avoiding the neutral (about pH 7 to 8) region (FIGS. 4I and 4J). Thus, it was confirmed that heat-resistant proteins tend to be either highly negatively charged or highly positively charged under the physiological pH.

Example 3: Selection of Structurally Disordered Protein

The LC-MS/MS analysis has an intrinsic bias, and can only detect proteins expressed in HEK293T cells. Therefore, the IUPred score itself was utilized independently of the protein list identified by the LC-MS/MS analysis in Example 2, to select proteins from the entire human proteome for further functional analyses.

(1) Method

The human protein atlas (M. Uhlen et al., Science. 347, 1260419 (2015)) was used as a population to select proteins having high IUPred scores across their entire sequences (median of IUPred scores of all residues of greater than 0.6, excluding locally structured proteins with more than 25% of residues having an IUPred score of smaller than 0.4) and high expression levels (median RPKM of greater than 25) from the human protein atlas (M. Uhlen et al., Science. 347, 1260419 (2015)).

(2) Result

Figure 5:
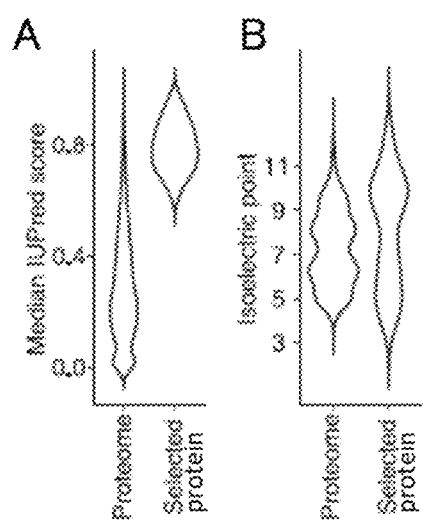
FIG. 5 shows (A) distributions of the medians of IUPred scores and (B) distributions of the isoelectric points, in the human protein atlas population and the proteins with a high IUPred score selected from the population. The width of each group indicates a proportion (or a relative value) of the protein.
Figure 6:
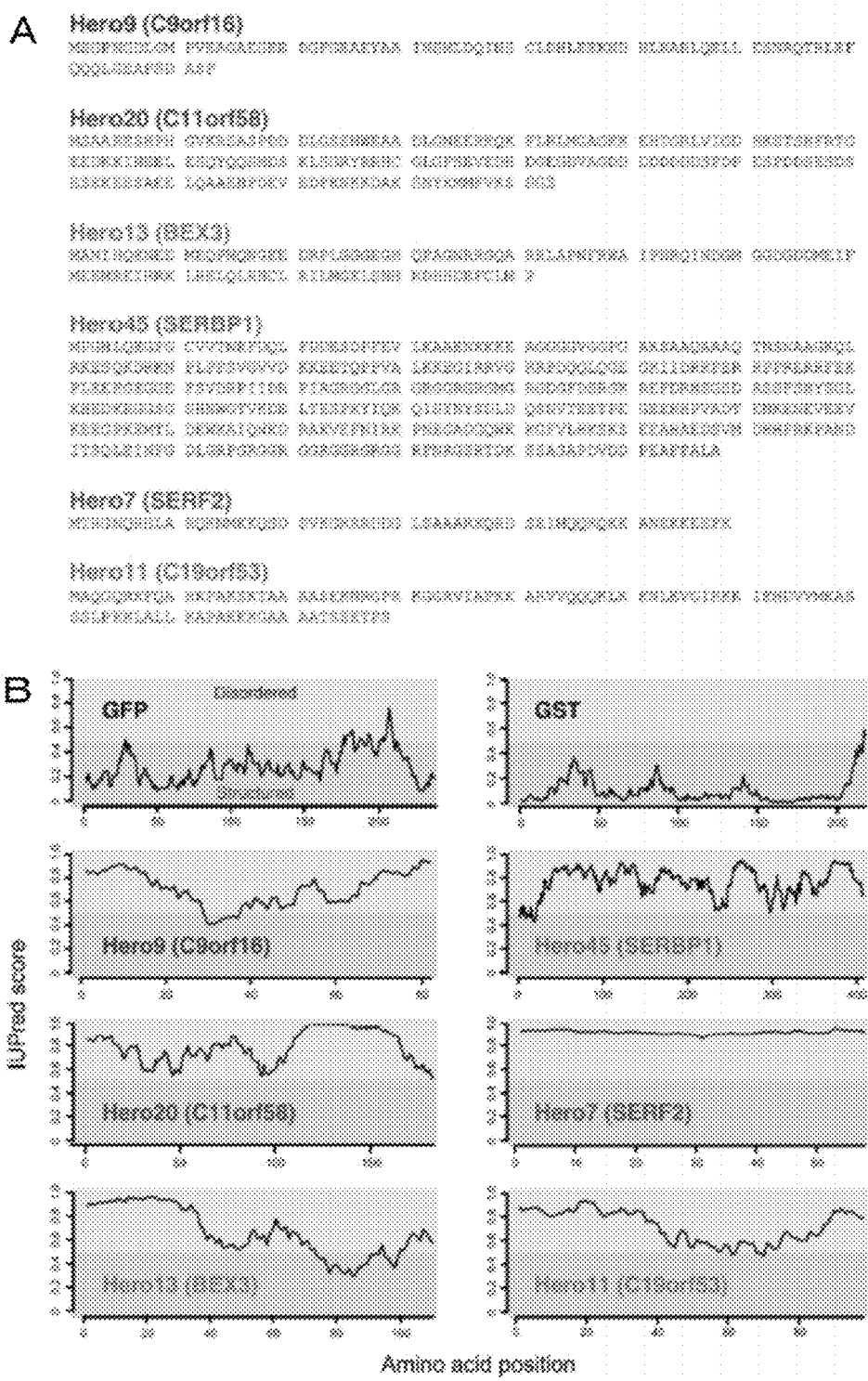
FIG. 6 shows amino acid sequences of six representative proteins and prediction of disordered regions. (A) shows the amino acid sequences of the six representative proteins: Hero9 (SEQ ID NO: 2); Hero20 (SEQ ID NO: 5); Hero13 (SEQ ID NO: 4); Hero45 (SEQ ID NO: 6); Hero7 (SEQ ID NO: 1); and Hero11 (SEQ ID NO: 3). (B) shows prediction of disordered regions by IUPred using the default settings (Z. Dosztanyi, V. Csizmok, P. Tompa, I. Simon, J. Mol. Biol. 347, 827-839 (2005)). As controls, green fluorescent protein (GFP) and glutathione S-transferase (GST) were used.

About 450 human proteins were identified (FIG. 5A). These proteins also showed a bimodal isoelectric point (pI) distribution (FIG. 5B). Among these proteins, six representative proteins, i.e., SERF2 (P84101), C9orf16 (Uniprot identifier; Q9BUW7), C19orf53 (Q9UNZ5), BEX3 (Q00994), C11orf58 [SMAP] (O00193) and SERBP1 (Q8NC51) were chosen for further analysis (FIG. 6A). Four out of these proteins (C9orf16, C11orf58, SERBP1 and SERF2) were detected by the LC-MS/MS in Example 2. For these six proteins, the intrinsically disordered structure was predicted using IUPred (FIG. 6B). The pI values for the six proteins were 4.13 (C9orf16), 4.57 (C11orf58), 5.31 (BEX3), 8.66 (SERBP1), 10.44 (SERF2), and 11.55 (C19orf53), respectively.

Example 4: Analysis of Function of Representative Hero Protein (1) Analysis of Heat Solubility of Hero Protein
A. Plasmid Construction pCAGEN-Flag-Hero9, -20, -13, -45, -7 or -11 was prepared as follows: a DNA fragment containing Hero9, -20, -13, -45, -7 or -11 (C9orf16, C11orf58, BEX3, SERBP1, SERF2 or C19orf53) was amplified from HEK293T cell cDNA by PCR and cloned into pENTR/D-TOPO (manufactured by Invitrogen), followed by recombination with pCAGEN-Flag-DEST using Gateway LR Clonase (manufactured by Invitrogen). pCAGEN-Flag-GST and pCAGEN-Flag-GFP were prepared by inserting a DNA fragment containing GST or GFP with an N-terminal FLAG tag into pCAGEN by using NEBuilder HiFi DNA Assembly Master Mix (manufactured by NEB).

B. Method

The heat solubility of the six candidate proteins selected in Example 3, together with green fluorescent protein (sometimes referred to simply as "GFP" herein) and GST as controls, was analyzed. The plasmids prepared in the above A were expressed as FLAG-tagged proteins in HEK293T cells, and the cell lysates were boiled at 95° C. for 15 minutes. Then, the supernatants were analyzed by western blotting using an anti-DDDDK antibody (M185, manufactured by MBL) diluted at 1:10,000. Images were acquired by Amersham Imager 600 (manufactured by GE Healthcare).

C. Result

Figure 7:
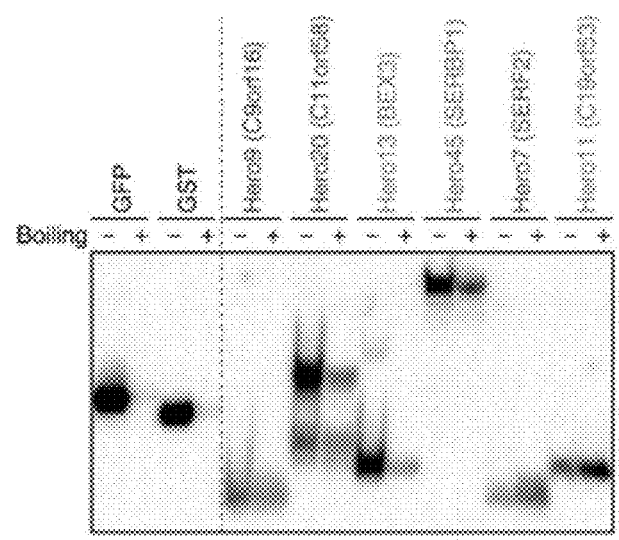
FIG. 7 shows that Hero proteins protect the activities of various proteins under stress conditions. Heat solubility of the selected six Hero proteins. Each Hero protein, GFP or GST was fused with a FLAG tag and expressed in HEK293T cells. The cell lysates were prepared with (+) or without (−) boiling, and then the proteins in the lysates or their supernatants were detected by the western blotting method using an anti-FLAG antibody. The boiled supernatants were each loaded in an amount twice the amount of the non-boiled lysate.

The results were as shown in FIG. 7. All of the six proteins were readily detectable in the soluble supernatants after boiling, whereas GFP and GST were hardly detected in the boiled supernatants. Based on their unusual heat resistance and unstructured nature, we call this protein class HEat-Resistant Obscure (Hero) proteins and added the molecular weight to distinguish the proteins from each other, following the naming convention for heat shock proteins (e.g., Hsp70). We regard SERF2, C9orf16, C19orf53, BEX3, C11orf58, and SERBP1 as Hero7 (SEQ ID NO: 1), Hero9 (SEQ ID NO: 2), Hero11 (SEQ ID NO: 3), Hero13 (SEQ ID NO: 4), Hero20 (SEQ ID NO: 5), and Hero45 (SEQ ID NO: 6), respectively.

Example 5: Purification and Analysis of Function of Hero Protein (1) Protective Effect of Hero Protein Against Desiccation of Lactate Dehydrogenase (LDH)

A. Plasmid Construction pCold I-GFP, GST, Hero9, Hero20, Hero13, Hero45, Hero7, or Hero11-FlagHis was prepared as follows: a DNA fragment containing CDS of each Hero protein and C-terminal FLAG- and His-tags was inserted into pCold I by NEBuilder HiFi DNA Assembly Master Mix (manufactured by NEB). For Hero13 and Hero45, a codon-optimized DNA fragment (manufactured by Eurofins) was synthesized and utilized as the template.

B. Purification of Hero Protein

Recombinant proteins of GST, Hero9, -20, -13, -45, -7, and -11 were expressed as C-terminal His-tagged proteins in the *E. coli* Rosetta 2 (DE3) strain. Typically, the cells were cultivated to an $OD_{600}$ of 0.4 to 0.6 at 37° C. together with ampicillin and then allowed to grow at 15° C. overnight together with 1 mM isopropyl-β-D-thiogalactoside (IPTG). The cell pellets were resuspended in a His A buffer (30 mM HEPES-KOH pH 7.4, 200 mM KOAc, 2 mM $Mg(OAc)_2$, and 5% glycerol) containing 1×EDTA-free Protease Inhibitor Cocktail (manufactured by Roche), sonicated, and centrifuged at 10,000 g for 5 minutes twice. The supernatant was added to a slurry of cOmplete His-Tag Purification Resin (manufactured by Roche) and incubated for 1 hour at room temperature or for 2 hours at 4° C., and then eluted with a His B buffer (His A buffer containing 400 mM imidazole). The eluents were collected, and the buffer was exchanged for PBS with PD-10 (manufactured by GE Healthcare).

C. Method

The LDH activity was measured according to the method described in Example 1, (4)A, except that 5 μg/mL purified lactate dehydrogenase (LDH) derived from rabbit muscle (manufactured by Roche) was diluted to 5 μg/mL with PBS containing 4 μg/mL BSA, GST or each Hero protein prepared in the above B, 400 μg/mL trehalose or 2 mg/mL arginine.

D. Result

Figure 8:
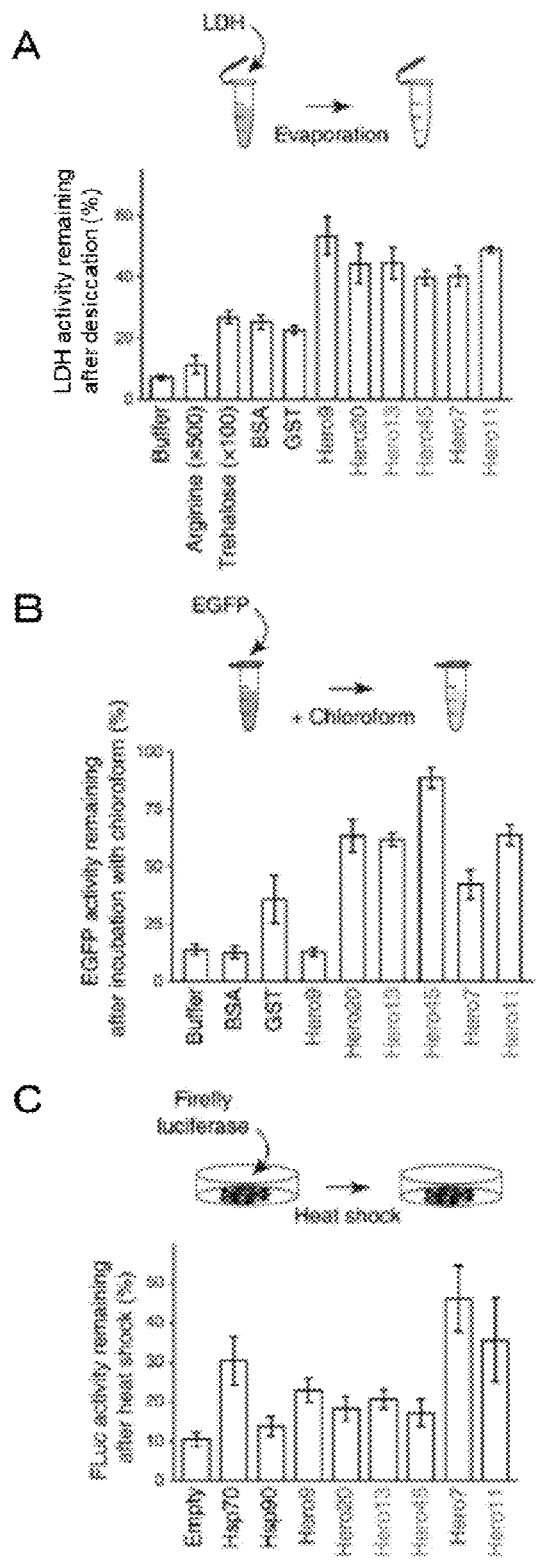
FIG. 8 shows that Hero proteins protect the activities of various proteins under stress conditions. (A) Hero proteins protect the LDH activity from desiccation. LDH mixed with each Hero protein or control was dried up overnight and the remaining LDH activities were measured. Note that much higher concentrations of arginine (500-fold) and trehalose (100-fold) were used, as compared to those of the proteins. Data are normalized to the activity of LDH incubated on ice overnight and represent means±SD from three independent experiments. (B) Hero proteins protect GFP in an organic solvent. GFP mixed with each Hero protein or control was exposure to chloroform and the remaining GFP fluorescence was measured. Data were normalized to GFP without exposure to chloroform, and represent means±SD from three independent experiments. (C) Hero proteins protect the luciferase activity from heat shock. Firefly luciferase was transfected into HEK293T cells, together with each Hero protein or chaperone factor, and then the cells were exposed to heat shock. The remaining luciferase activities after heat shock were measured. Data were normalized to the activity of luciferase in cells without exposure to heat shock, and represent means±SD from five independent experiments.

The results were as shown in FIG. 8A. Like the results obtained using the boiled supernatants (see FIG. 3), it was confirmed, from the results in FIG. 8A, that all of the six Hero proteins protected the LDH activity at about 50%, which effect was much stronger compared to BSA, GST or the conventional protein stabilizing agent arginine or trehalose.

(2) Protective Effect of Hero Protein Against Denaturation of Enhanced Green Fluorescent Protein (EGFP)

A. Plasmid Construction pCold I-GST, Hero9, Hero20, Hero13, Hero45, Hero7 or Hero11-FlagHis was prepared in accordance with the description in the above (1)A.

B. Protein Purification

Protein purification was performed in accordance with the description in the above (1)B. Recombinant protein of EGFP was expressed and purified in accordance with the procedures described in S. Iwasaki et al., Nature. 521, 533-536 (2015).

C. Method

Ten (10) μg/mL enhanced green fluorescent protein (referred to simply as "EGFP" herein) was mixed with 50 μg/mL BSA, GST or each Hero protein prepared in the above B, followed by the addition of the same volume of chloroform. The samples were continuously shaken at room temperate for 30 minutes and centrifuged at 10,000 g for 1 minute. The EGFP intensity in the supernatants (i.e., in the water phase) was measured.

D. Result

The results were as shown in FIG. 8B. When EGFP was exposed to chloroform, its fluorescence intensity was reduced to about 10% of the native state. In contrast, four out of the six Hero proteins maintained >60% of the EGFP activity. Strikingly, it was confirmed that, in the presence of Hero45, the EGFP fluorescence remained undiminished even in chloroform. This is reminiscent of the ability of methacrylate-based random heteropolymers (RHPs) to preserve the horseradish peroxidase (HRP) activity in toluene (B. Panganiban et al., Science. 359, 1239-1243 (2018)). These results demonstrated that naturally occurring Hero proteins act as molecular shields to stabilize proteins, even against harsh conditions.

(3) Protective Effect of Hero Protein Against Heat Shock of Client Protein

A. Plasmid Construction pCAGEN-Flag-Hero9, -20, -13, -45, -7 or -11 was prepared in accordance with the description in Example 4, (1)A. pCold-Hsc70-4 and Hsp83 are described in S. Iwasaki et al., Nature. 521, 533-536 (2015). pCAGEN-FLuc was prepared by inserting firefly luciferase into pCAGEN using NEBuilder HiFi DNA Assembly Master Mix (manufactured by NEB). pCAGEN-Flag-DEST is described in S. Iwasaki et al., Nature. 521, 533-536 (2015).

B. Method

Firefly luciferase was expressed together with each of the six Hero proteins, Hsp70, or Hsp90 in HEK293T cells, then the cells were subjected to heat shock. Specifically, HEK293T cells in a 96-well plate were transfected with 10 ng pCAGEN-FLuc prepared in the above A and 90 ng empty pCAGEN or pCAGEN-Flag-Hero9, -20, -13, -45, -7, or -11 by using Lipofectamine 3000 (manufactured by Thermo Fisher Scientific). After about 48 hours, 4 mM cycloheximide was added to the medium, and the cells were incubated at 37° C. for 10 minutes and then subjected to a heat shock at 45° C. for 8 minutes. The cells were lysed by Passive Lysis Solution (manufactured by Perkin Elmer) and incubated for 15 minutes at room temperature, and the lysates were collected. The luciferase activity of Fluc was measured by using sensilite Enhanced Flash Luminescence (manufactured by Perkin Elmer).

C. Result

The results were as shown in FIG. 8C. The luciferase activity was reduced to about 10% of the original level by heat shock. Overexpression of the conventional chaperones Hsp70 or Hsp90 maintained about 15 to 30% of the luciferase activity. It was confirmed that the Hero proteins protected luciferase from heat shock as well as or better than the chaperones, with the Hero7 protein protecting about 50% of luciferase activity. A combination of the results of Examples 4 and 5 verified that the Hero proteins have the effect for stabilizing various proteins both in vitro and in cells.

(4) Protective Effect of Fragmented *Drosophila* Hero Protein Against Heat Shock of Client Protein A. Plasmid Construction CG1943, CG12384 and CG14818 were cloned by the cDNA library derived from fly S2 cells and inserted into a pCAGEN-F vector. pCAGEN-Flag-Hero9 or -20 was prepared in accordance with the description in Example 4, (1)A. For the fragmented protein, the unnecessary sequence was eliminated by using inverse PCR.

B. Method

The same procedures as described in the above (3)B were performed except that the plasmid prepared in the above A was used. An N-terminal fragment of the fragment obtained by dividing each full-length Hero protein at the center of the full amino acid sequence length was defined as Fragment 1, and a C-terminal fragment thereof was defined as Fragment 2. The sequences of the respective proteins are: full-length protein (SEQ ID NO: 7), Fragment 1 (SEQ ID NO: 8) and Fragment 2 (SEQ ID NO: 9) of CG1943; full-length protein (SEQ ID NO: 10), Fragment 1 (SEQ ID NO: 11) and Fragment 2 (SEQ ID NO: 12) of CG12384; full-length protein (SEQ ID NO: 13), Fragment 1 (SEQ ID NO: 14) and Fragment 2 (SEQ ID NO: 15) of CG14818; Fragment 1 (SEQ ID NO: 16) and Fragment 2 (SEQ ID NO: 17) of Hero9; and Fragment 1 (SEQ ID NO: 18) and Fragment 2 (SEQ ID NO: 19) of Hero20.

C. Result

Figure 9:
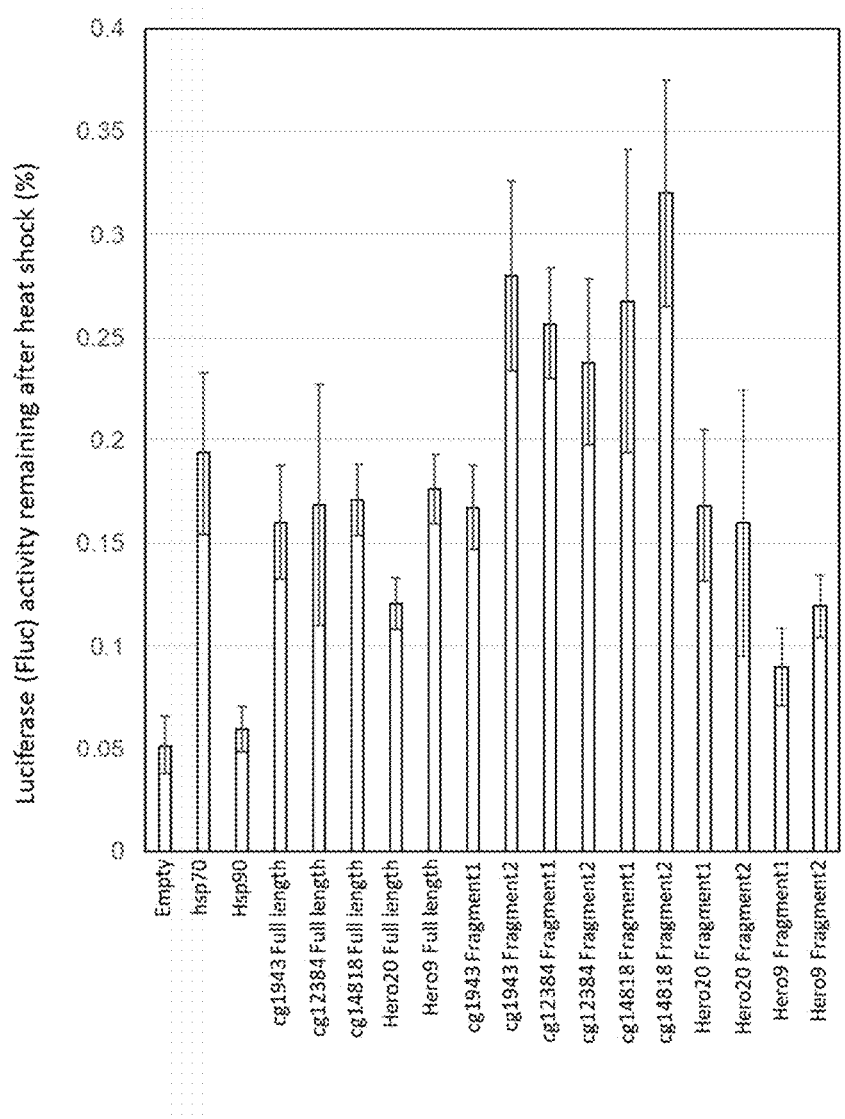
FIG. 9 shows that fragmented Hero proteins protect the luciferase activity from heat shock.

The results were as shown in FIG. 9. The luciferase activity was reduced to about 10% of the original level by heat shock. Overexpression of the conventional heat shock protein Hsp70 or Hsp90 maintained about 15 to 30% of the luciferase activity. It was confirmed that the Hero protein fragments obtained by halving the *Drosophila* and human Hero proteins protected the luciferase activity from heat shock as well as or better than the respective full-length Hero proteins. In combination with the results presented in the above (3), the Hero proteins were confirmed to have the effect for stabilizing the protein even when fragmented.

Example 6: Suppressive Effect of Hero Protein Against Aggregation of Aggregate Protein (1)

Protein instability is often linked to diseases, especially neurodegenerative disorders. For example, aggregation of TAR DNA-binding protein of 43 kDa (TDP-43) is observed in virtually all the cases of amyotrophic lateral sclerosis (ALS) and in about half the cases of frontotemporal dementia (FTD) (M. Neumann et al., Science. 314, 130-133 (2006)). Given the strong activity of Hero proteins to stabilize proteins (see FIGS. 1 to 9), it was tested whether Hero proteins can prevent pathogenic aggregation of TDP-43.

(1) Suppressive Effect of Hero Protein Against Aggregation of Client Protein In Vitro A. Plasmid Construction pCold I-GstTev-TDP-43-HA was prepared as follows. A DNA fragment containing an N-terminal GST tag and a TEV protease recognition sequence was inserted into pCold I (manufactured by Takara), and, subsequently, a DNA fragment containing a C-terminal 2×HA tag was inserted by NEBuilder HiFi DNA Assembly Master Mix (manufactured by NEB). Finally, a DNA fragment containing TDP-43 was inserted into pCold I-GstTev-HA by NEBuilder HiFi DNA Assembly Master Mix (manufactured by NEB) to prepare pCold I-GstTev-TDP-43-HA. pCold I-GST, Hero9, Hero20, Hero13, Hero45, Hero7 or Hero11-FlagHis was prepared in accordance with the description in Example 5, (2)A.

B. Protein Purification

Recombinant proteins of GST, Hero9, -20, -13, -45, -7, and -11 were purified in accordance with the description in Example 5, (2)B. Recombinant protein of GST-TEV-TDP-43-HA was expressed in the *E. coli* Rosetta 2 (DE3) strain. Typically, the cells in 1-L culture were cultivated to an $OD_{600}$ of 0.4 to 0.6 at 37° C. together with ampicillin and then allowed to grow at 15° C. overnight together with 1 mM isopropyl-β-D-thiogalactoside (IPTG). The cell pellets were resuspended in PBS containing 0.5 M NaCl, 0.1% Toriton, 10 mg/L RNase A (manufactured by Nacalai Tesque), and 1×EDTA-free Protease Inhibitor Cocktail (manufactured by Roche) (L. Guo et al., Cell. 173, 677-692 (2018)), sonicated, and centrifuged at 10,000 g for 5 minutes twice. The supernatant was added to a slurry of Glutathione Sepharose 4 Fast Flow (manufactured by GE Healthcare), incubated at 4° C. for two hours, and then eluted with a GST elution buffer (100 mM Tris-HCl pH8.0, 0.20 mM glutathione, and 100 mM NaCl). The eluate was recovered, and the buffer was exchanged for PBS with PD-10 (manufactured by GE Healthcare).

C. Method

The recombinant protein of GST-TEV-TDP-43-HA prepared in the above B was mixed with BSA (100 μg/mL), GST (100 μg/mL) and each Hero protein (100 μg/mL) prepared in the above B, arginine (2 mg/mL) or trehalose (500 μg/mL), and incubated at 37° C. for 16 hours. Subsequently, PBS containing a 5-fold volume of 1% SDS was added, and loaded onto a cellulose acetate membrane with a 0.2-μm pore size (manufactured by GE Healthcare) that had been incubated in PBS containing 1% SDS. After washing with 1% SDS, aggregates were detected by using an anti-HA antibody (M180, manufactured by MBL) diluted at 1:10, 000. Images were acquired by Amersham Imager 600 (manufactured by GE Healthcare).

D. Result

Figure 10:
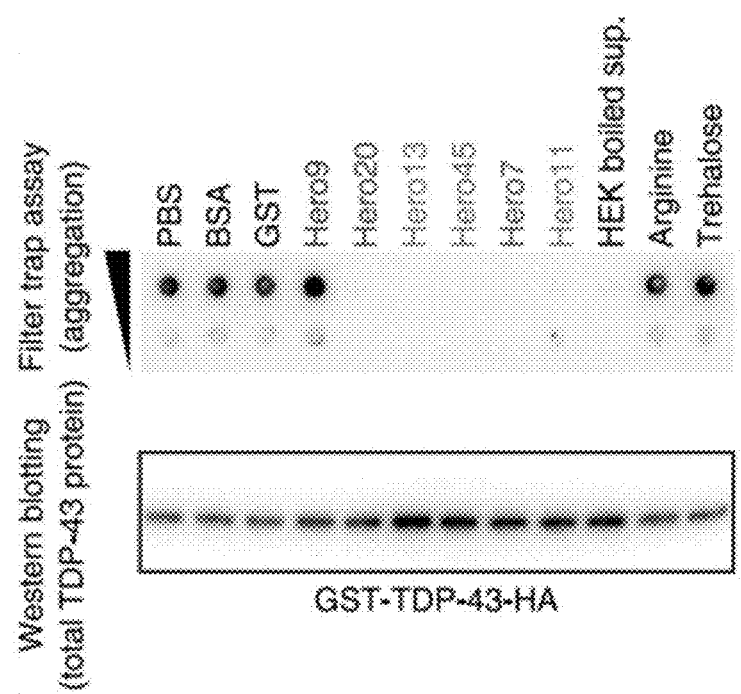
FIG. 10 shows that Hero proteins protect aggregation of pathogenic proteins in vitro. A filter trap assay of TDP-43 aggregation formed in vitro. Recombinant GST-TDP-43-HA was incubated in the presence of each Hero protein or control. The original samples or 5-fold diluted samples were each loaded on a cellulose acetate membrane in the presence of 1% SDS, and the trapped aggregates were probed with an anti-HA antibody. The total amount of GST-TDP-43-HA remained unchanged, as detected by western blotting using an anti-HA antibody.

The results were as shown in FIG. 10. Surprisingly, it was confirmed that five out of the tested six human Hero proteins almost completely inhibited TDP-43 aggregation, as is the case with the boiled HEK293T supernatant, but that BSA, GST and the conventional protein stabilizing agents, arginine and trehalose, did not inhibit aggregation.

(2) Suppressive Effect of Hero Protein Against Aggregation of Client Protein in Cell A. Plasmid Construction pCAGEN-GFP-TDP43ΔNLS was prepared as follows: a DNA fragment containing TDP-43 was amplified from HEK293T cell cDNA by PCR and cloned into pENTR/D-TOPO (manufactured by Invitrogen), followed by recombination with pCAGEN-GFP-DEST using Gateway LR Clonase (manufactured by Invitrogen). NLS deletion (78 to 99) in TDP-43 was performed by PCR-based site-directed mutagenesis. pCAGEN-HTTQ103-GFP was prepared as follows: a DNA fragment containing HTT103Q-GFP was amplified from p426 103Q GPD (Addgene #1184; S. Krobitsch, S. Lindquist, Proc. Natl. Acad. Sci. U.S.A. 97, 1589-94 (2000)), and inserted into pCAGEN using NEBuilder HiFi DNA Assembly Master Mix (manufactured by NEB). pCAGEN-GFP-GA50 was prepared as follows. A DNA fragment containing GA 50 was amplified from pAG303-Gal-GA 50 (Addgene #84907; A. Jovicic et al., Nat. Neurosci. 18, 1226-1229 (2015)), and a DNA fragment containing GFP was inserted into pCAGEN by NEBuilder HiFi DNA Assembly Master Mix (manufactured by NEB). pCAGEN-Flag-Hero9, -20, -13, -45, -7 or -11 was prepared in accordance with the description in Example 4, (1)A.

B. Method

Aggregation-prone proteins were expressed as GFP fusions, together with each of the six human Hero proteins or GST as a control, in HEK293T cells. Specifically, HEK293T cells in a 12-well plate were transfected with 100 ng pCAGEN-GFP-HTTQ103, 100 ng pCAGEN-GFP-GA50 or 200 ng pCAGEN-GFP-TDP43ΔNLS, and 900 ng (for HTTQ103 and GA50) or 800 ng (for TDP43ΔNLS) pCAGEN-Flag-Hero9, -20, -13, -45, -7 or -11 by using Lipofectamine 3000 (manufactured by Thermo Fisher Scientific). After about 48 hours, the cells were resuspended in 200 μL PBS containing 1× cOmplete EDTA-free Protease Inhibitor Cocktail (manufactured by Roche) and sonicated by Bioruptor II (manufactured by BMBio). The total protein concentrations were adjusted and then 1% SDS was added. The samples were subjected to a filter trap assay in accordance with the description in the above (1)C, and aggregates were detected by using an anti-GFP antibody (sc-9996, manufactured by Santa Cruz) diluted at 1:10,000. Images were acquired by Amersham Imager 600 (manufactured by GE Healthcare). It should be noted that HTTQ103 consists of a stretch of 103 polyglutamine residues derived from an abnormal CAG expansion found in a Huntington disease-causing huntingtin mutant (S. Krobitsch, S. Lindquist, Proc. Natl. Acad. Sci. U.S.A. 97, 1589-94 (2000)). GA50 (50 Glycine-Alanine repeats) is derived from abnormal GGGGCC repeats found in the ALS-causing C9orf72 intron (K. Mori et al., Science. 339, 1335-8 (2013)). TDP-43 lacking the nuclear localization signal (TDP-43ΔNLS) is more prone to aggregation than the wild type because of its forced cytoplasmic localization (Nonaka T et al., Hum Mol Genet., 18(18): 3353-64(2009)).

C. Result

Figure 11:
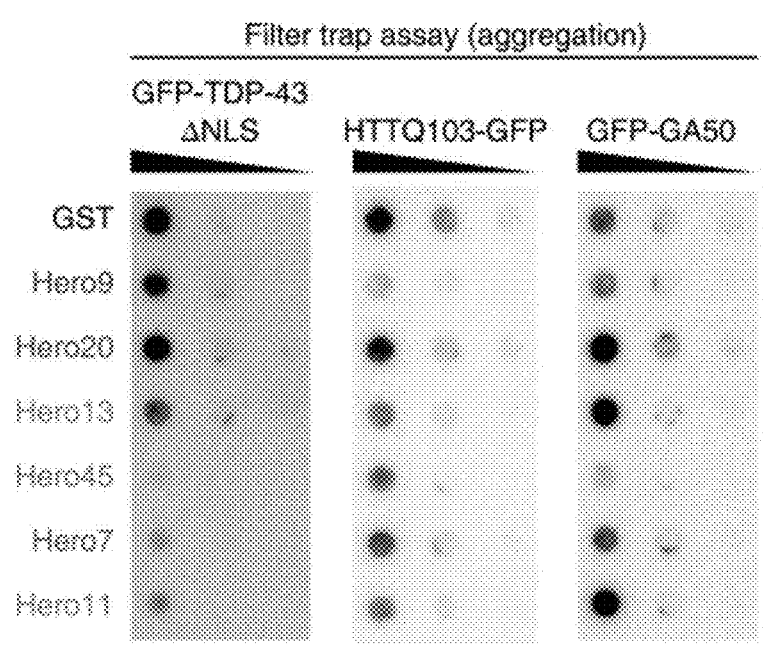
FIG. 11 shows that Hero proteins prevent aggregation of pathogenic proteins in cells. A filter trap assay of aggregation-prone proteins expressed in cells. TDP-43ΔNLS, HTTQ103 or GA50 was expressed in the form of a GFP fusion, together with each Hero protein or the GST control, in HEK293T cells. A stock solution, 5-fold diluent and 25-fold diluent of the cell lysate were subjected to the filter trap assay and probed with an anti-GFP antibody.

The results were as shown in FIG. 11. Hero45, -7 and -11 strongly suppressed aggregation of TDP-43ΔNLS in the cells. Further, it was confirmed that the aggregation of HTTQ103 and GA50 was also significantly reduced by Hero9 (HTTQ103), Hero45 (GA50) and some other Hero proteins.

(3) Suppressive Effect of Hero Protein Against Aggregation of Client Protein Through Microscopic Observation A. Plasmid Construction A plasmid was constructed in accordance with the description in the above (2)A.

B. Method

HEK293T cells were transfected in accordance with the description in the above (2)B. Cell images were acquired with an inverted microscope (IX83, manufactured by Olympus) with a 20× objective lens (UCPLFLN 20×, 0.7 NA, manufactured by Olympus).

C. Result

Figure 12:
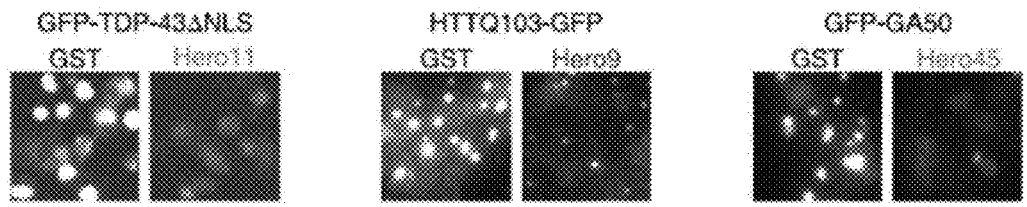
FIG. 12 shows that Hero proteins prevent aggregation of pathogenic proteins in cells. Representative microscopic images of GFP signals in the cells transfected with GFP-tagged TDP-43ΔNLS, HTTQ103 or GA50, together with GST (control) or each Hero protein.

The results were as shown in FIG. 12. From the results shown in FIG. 12, aggregation of GFP-tagged TDP-43ΔNLS, HTTQ103 and GA50 and their suppression by coexpression of the Hero proteins were clearly observed at the microscopic level.

(4) Suppressive Effect of Shuffled Hero Protein Against Aggregation of Aggregate Protein A. Plasmid Construction pCAGEN-Flag-Shuffled100 (GST, Hero7, Hero11 or Hero45) was prepared by inserting a DNA fragment containing shuffled 100-amino acid residue sequences with the amino acid residue composition ratio of GST, Hero7, Hero11 or Hero45 into a pCAGEN-Flag-DEST vector. pCAGEN-superFlag-Shuffled42 (GST, Hero7, Hero11 or Hero45) was prepared by inserting a DNA fragment containing N-terminal superFlag (Layton et al., 2019) and shuffled 42-amino acid residue sequences with the amino acid residue composition ratio of GST, Hero7, Hero11 or Hero45 into a pCAGEN-superFlag-DEST vector. Protein shuffling was performed by using software for generating random protein sequences (Random protein sequence generator, RandSeq, https://web.expasy.org/randseq/). The amino acid sequences of the shuffled Hero proteins are: 100-amino acid residue sequences (SEQ ID NOs: 20 to 22) and 42-amino acid residue sequences (SEQ ID NOs: 23 and 24) of Hero7; 100-amino acid residue sequences (SEQ ID NOs: 25 to 27) and 42-amino acid residue sequences (SEQ ID NOs: 28 and 29) of Hero11; 100-amino acid residue sequences (SEQ ID NOs: 30 to 32) and 42-amino acid residue sequences (SEQ ID NOs: 33 and 34) of Hero45; and original sequence (SEQ ID NO: 35), 100-amino acid residue sequences (SEQ ID NOs: 36 to 38) and 42-amino acid residue sequences (SEQ ID NOs: 39 and 40) of GST.

B. Method

The filter trap assay was conducted using pCAGEN-GFP-TDP43ΔNLS in accordance with the description in the above (2)B.

C. Result

Figure 13:
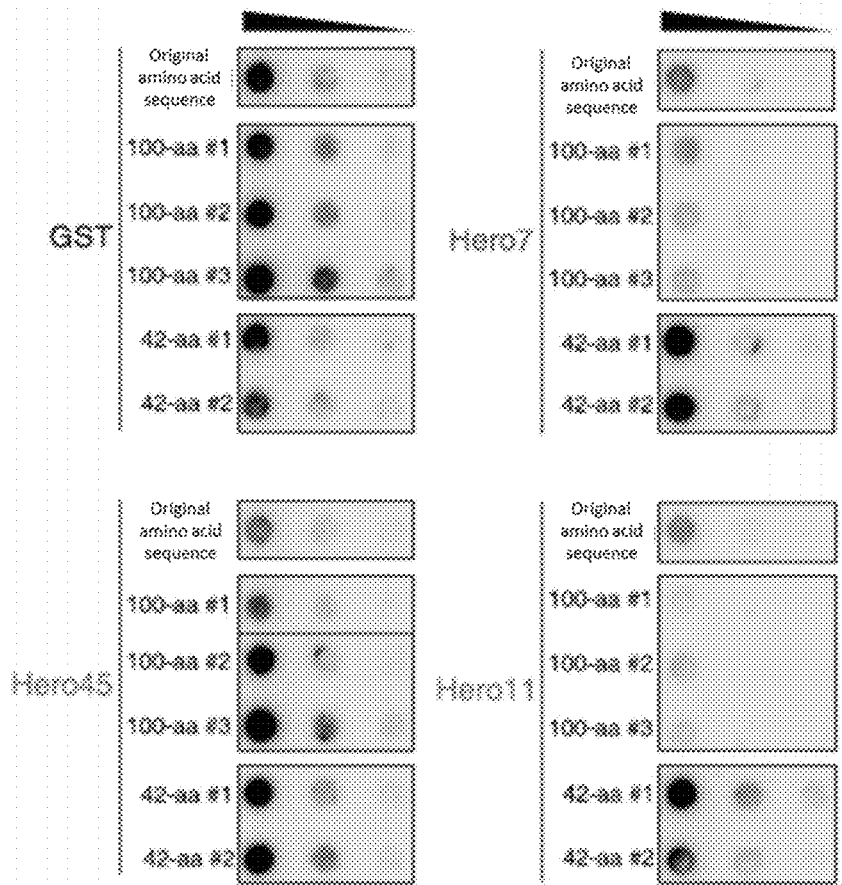
FIG. 13 shows that shuffled Hero proteins prevent pathogenic protein aggregation in cells.

The results were as shown in FIG. 13. It was demonstrated that Hero45, -7 and -11, which inhibited the cellular aggregation of TDP-43ΔNLS (see FIG. 11), have very high positive charges (pI=8.66, 10.44 and 11.55, respectively), with high proportions of basic amino acid residues (proportion of arginine+lysine=18.4%, 32.2% and 27.3%, respectively). To confirm a possibility that these positively charged properties may be important for the functions of the Hero proteins to inhibit TDP-43ΔNLS aggregation, the amino acid sequences of Hero7, -11 and -45, and GST as a control were randomly shuffled, while maintaining the original amino acid residue composition ratios of the Hero proteins (i.e., proportions of the respective amino acid residues relative to the total number of amino acid sequences) and fixing the total number of amino acids at 100 or 42 amino acids. Three different shuffle sequences were prepared for 100 amino acid residues, and two different shuffle sequences were prepared for 42 amino acid residues. The 100-amino acid residue sequences obtained by shuffling the Hero proteins inhibited the aggregation of TDP-43ΔNLS with comparable or even higher efficiencies than the original Hero proteins. Also, the 42-amino acid residue sequences obtained by shuffling the Hero proteins were confirmed not to inhibit the aggregation of TDP-43ΔNLS. These results demonstrated that the amino acid composition and length of the Hero proteins (i.e., their molecular nature as long, hydrophilic, and highly charged "polymers"), but not their amino acid sequence per se, affect the aggregation of the client proteins (at least TDP-43ΔNLS).

Example 7: Suppressive Effect of Hero Protein Against Aggregation of Aggregate Protein (2)

Drosophila eyes have been used as a model system useful for studying neurodegenerative diseases. Drosophila melanogaster eyes were used to evaluate the aggregation preventing effect of Hero proteins in vivo.

A. Plasmid Construction pUASg-HA.attB-Hero9, -13, -45 or -11 was prepared as follows: a DNA fragment containing Hero9, -13, -45, or -11 in pENTR was inserted into pUASg-HA-attB (DGRC #1423) using Gateway LR Clonase (manufactured by Invitrogen). Drosophila culture and crosses were carried out at 25° C. (the same applies hereinafter).

B. Method

All general Drosophila stocks were obtained from the Bloomington and Kyoto Drosophila Stock Center (the same applies hereinafter). Drosophila flies carrying pUASg.attB-Hero9, -13, -45 and -11 transgenes were prepared by standard phiC31 integrase-mediated transgenesis (manufactured by Bestgene Inc.). GMR-Gal4 was used to express the transgenes in the retina. UAS-MJDtr-Q78 (J. M. Warrick et al., Cell. 93, 939-949 (1998)), UAS-TDP-43-YFP and UAS-YFP lines (A. C. Elden et al., Nature. 466, 1069-1075 (2010)) were provided by Dr. Nancy Bonini (the same applies hereinafter).

C. Result

Figure 14:
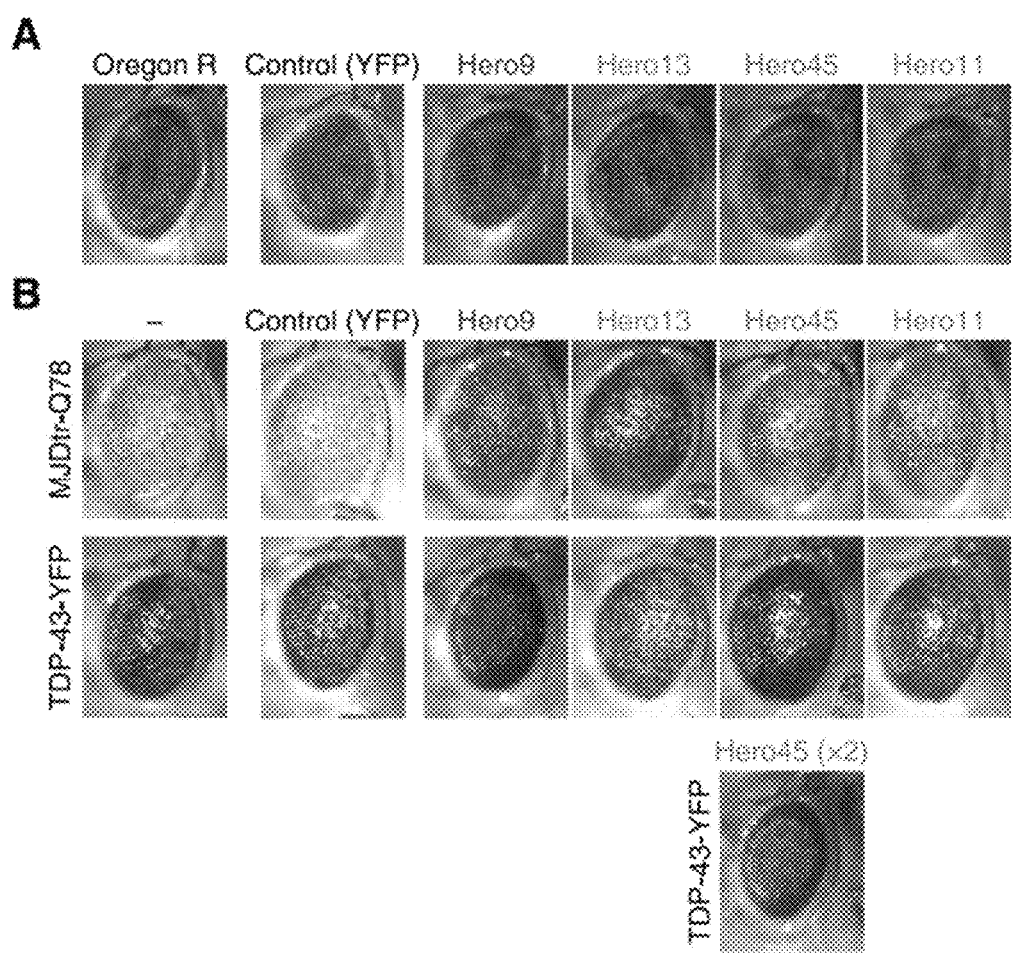
FIG. 14 shows that Hero proteins suppress the neurotoxicity of protein aggregates in *Drosophila* eyes. (A) Expression of Hero9, -13, -45, or -11 alone showed no phenotype in the external eye morphology, much as the control (YFP). The genotype of Oregon R was +/+;+/+, and that of the control (YFP), Hero9, -13, -45 or -11 was GMR-GAL4; UAS-YFP, UAS-Hero9, -13, -45, or -11/SM6a-TM6B. (B) Expression of MJDtr-Q78 or TDP-43-YFP caused the external eye degeneration. Expression of Hero9 and Hero13 somewhat alleviated the eye degeneration by MJDtr-Q78 (upper row). The genotype of – was GMR-GAL4/+;UAS-MJDtr-Q78/TM3. The genotype of the control (YFP) was GMR-GAL4/+;UAS-MJDtr-Q78/UQS-YFP. The genotype of Hero9, -13, -45 or -11 was GMR-GAL4/+;UAS-MJDtr-Q78/UAS-Hero9, -13, -45 or -11. Expression of Hero9 and double copies of Hero45 strongly suppressed the eye degeneration by TDP-43-YFP (lower row). The genotype of – was GMR-GAL4, UAS-TDP-43-YFP/+;TM3/+. The genotype of the control (YFP) was GMR-GAL4, UAS-TDP-43-YFP/+;UAS-YFP/+. The genotype of Hero9, -13, -45 or -11 was GMR-GAL4, UAS-TDP-43-YFP/+;UAS-Hero9, -13, -45 or -11/+. The genotype of Hero45 (×2) was GMR-GAL4, UAS-TDP-43-YFP/+;UAS-Hero45/UAS-Hero45. Eyes were imaged in 1-day-old adult flies.

The results were as shown in FIG. 14. From the results shown in FIG. 14A, when transgenic Drosophila flies expressing Hero9, -13, -45 or -11 in the retina were prepared, and the transgenes were introduced into strains expressing MJDtr-Q78 and TDP-43-YFP, neither YFP nor any of the transgenic Hero proteins alone caused a detectable change in the normal eye morphology. From the results shown in FIG. 14B (upper row), overexpression of human Ataxin 3 containing a pathogenic expansion of 78 glutamine repetitive sequences (MJDtr-Q78) in the differentiating photoreceptor neurons of the Drosophila retina caused strong retinal degeneration (J. M. Warrick et al., Cell. 93, 939-949 (1998)), but coexpression of Hero9 or -13 partially rescued defects in eye chromogenesis. From the results shown in FIG. 14B (lower row), neurodevelopmental disorder in the eyes was caused also by expression of human TDP-43 fused with YFP (TDP-43-YTP) (A. C. Elden et al., Nature. 466, 1069-1075 (2010)), but was almost completely suppressed by coexpression of Hero9. The rescue effect of Hero45 on TDP-43-YFP was moderate but was enhanced by doubling the copy number of the transgene. These results demonstrated that the Hero proteins can suppress aggregation of pathogenic proteins in the living Drosophila nervous system, which were consistent with the results in vitro and in cells (see FIGS. 10 and 11).

Example 8: Suppressive Effect of Hero Protein Against Neurotoxicity of Aggregate Protein A. Method RNAi lines were obtained from the Vienna Drosophila Resource Center (Barinova et al., Nature 448:151-156 (2007)). The GMR-Gal4 line was used to express transgenes and/or induce RNAi by long hairpins in the retina. The RNAi lines used were UAS-KK(Piwi), KK(Hsc70-4), KK(CG17931), KK(CG14818), KK(Vig2), KK(CG12384) and KK(CG11444).

B. Result

Figure 15:
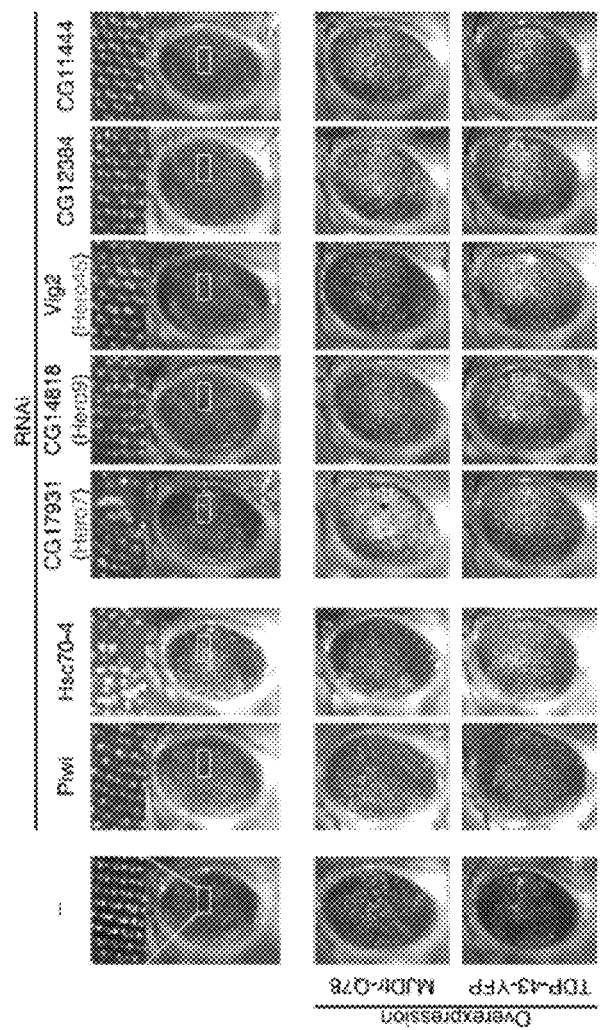
FIG. 15 shows that Hero proteins suppress the neurotoxicity of protein aggregates in *Drosophila* eyes. (Top row) The genotype of – was GMR-GAL4/+. The genotype of the control (Piwi) was GMR-GAL4/UAS-KK(Piwi). The genotype of Hsc70-4, CG17931, CG14818 or Vig2 was GMR-GAL4/UAS-KK(Hsc70-4), KK(CG17931), KK(CG14818) or KK(Vig2). The genotype of CG12384 or CG11444 was GMR-GAL4/UAS-KK(CG12384) or KK(CG11444). Knockdown of Hsc70-4 or CG17931 (*Drosophila* homolog of human Hero7) showed an eye degeneration phenotype. (Middle row) The genotype of – was GMR-GAL4/+;UAS-MJDtr-Q78/+. The genotype of the control (Piwi) was GMR-GAL4/UAS-KK(Piwi);UAS-MJDtr-Q78/+. The genotype of Hsc70-4, CG17931, CG14818 or Vig2 was GMR-GAL4/UAS-KK(Hsc70-4), KK(CG17931), KK(CG14818) or KK(Vig2);UAS-MJDtr-Q78/+. The genotype of CG12384 or CG11444 was GMR-GAL4/UAS-KK (CG12384) or KK(CG11444);UAS-MJDtr-Q78/+. The eye phenotype by overexpression of MJDtr-Q78 was exacerbated by depletion of CG17931, CG14818, Vig2, CG12384 and CG11444 through RNAi. (Bottom row) The genotype of – was GMR-GAL4;UAS-TDP43-YFP/+. The genotype of the control (Piwi) was GMR-GAL4;UAS-TDP43-YFP/ UAS-KK(Piwi). The genotype of Hsc70-4, CG17931, CG14818 or Vig2was GMR-GAL4;UAS-TDP43-YFP/ UAS-KK(Hsc70-4), KK(CG17931), KK(CG14818) or KK(Vig2). The genotype of CG12384 or CG11444 was GMR-GAL4;UAS-TDP43-YFP/UAS-KK(CG12384) or KK(CG11444). Eyes were imaged in 1-day-old female adult flies. The eye phenotype by overexpression of TDP-43-YFP was exacerbated by depletion of CG17931, CG14818, Vig2, CG12384 and CG11444 through RNAi.

The results were as shown in FIG. 15. It is known that Hsc70-4, the most abundant and constitutively expressed Hsp70 chaperone, is required for normal eye development in Drosophila flies (Chang et al., J. Cell Biol. 159, 477-487 (2002); Hagedorn et al., J. Cell Biol. 173, 443-452 (2006); and Kumar and Tiwari, Mol. Neurobiol. 55, 4345-4361 (2018)). From the results shown in FIG. 15, it was confirmed that knockdown of Hsc70-4 in the differentiating photoreceptor cells using a GMR-Gal4 driver showed a modest but detectable defect in eye morphology, whereas no eye abnormality was observed even though depletion of germline-specific Piwi (mock) (FIG. 15, top row). Eye-specific knockdown of CG17931, a distant homolog of human Hero7, showed an eye degeneration phenotype similar to that shown upon knockdown of Hsc70-4. These results demonstrated that not only classical chaperones but also Hero proteins play important roles in fly eye development. It is known that GMR-driven overexpression of human Ataxin 3 (MJDtr-Q78) containing a pathogenic expansion of 78 glutamine repetitive sequences causes retinal degeneration (Warrick et al., Cell 93, 939-949 (1998); FIG. 15, middle row). Also, neurodevelopmental disorder in the eyes is caused also by expression of human TDP-43 fused with YFP (Elden et al., Nature 466, 1069-1075 (2010); FIG. 15, bottom row). Defects by overexpression of these aggregate proteins were significantly exacerbated by simultaneous knockdown of CG17931 (a distant homolog of human Hero7, homology=78%, identity=58%), as compared with simultaneous knockdown of Piwi (negative control) (FIG. 15, middle and bottom rows). Exacerbated eye phenotypes by overexpression of MJDtr-Q78 and TDP-43-YFP were apparent also in the eye depleted of other endogenous Drosophila Hero proteins, CG14818 and Vig2, which are potential homologs of human Hero9 (homology=40%, identity=23%) and Hero45 (homology=41%, identity=30%), respectively, and CG12384 and CG11444 (which are highly likely to be fly-specific) (FIG. 15, middle and bottom rows). The above results demonstrated that the Hero proteins have the suppressive effect against eye degeneration associated with aggregation of aggregate proteins in living flies, which were consistent with the results in vitro and in cells (see FIGS. 7 to 13). The identity and homology values indicated above were calculated by DIOPT.

Example 9: Aggregation Suppressive Effect Obtained by Fusion of Aggregate Protein and Hero Protein A. Plasmid Construction A P2A peptide sequence and an mRuby3 sequence were added to the C-terminal of pCAGEN-GFP-TDP43DelNLS. Then, the GST, Hero9, -13, -20, -45, -9 or -11 sequence was added to the immediate upstream of the P2A sequence.

B. Method

The same procedures as described in Example 6, (2)B were performed except that the plasmid prepared in the above A was used. Also, GST has an anti-aggregation effect, and solubilization of proteins fused with GST is promoted. GST-tagged TDP43ΔNLS was used as a positive control.

C. Result

Figure 16:
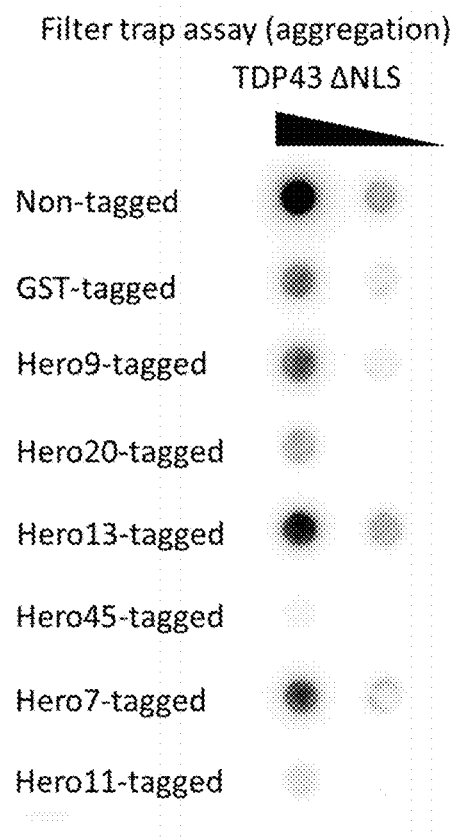
FIG. 16 shows the aggregation suppressive effect of the Hero proteins when a fusion of TDP43ΔNLS and each Hero protein was expressed.

The results were as shown in FIG. 16. The aggregation suppressive effect of the Hero proteins when a fusion of an aggregate protein, TDP43ΔNLS, and each Hero protein was expressed was observed. Aggregation was not suppressed when non-tagged TDP43ΔNLS (negative control) was used. When GST-fused TDP43ΔNLS (positive control) was used, aggregation was somewhat suppressed. Aggregation of TDP43ΔNLS was confirmed to be more strongly suppressed in TDP43ΔNLS fused with Hero protein, as compared with GST. The above results verified that fusion of the Hero proteins to the aggregate protein suppresses aggregation of the aggregate protein.

The invention claimed is:

1. A method for screening for a client protein-protecting protein, comprising a step of selecting one or more candidate proteins having an intrinsically disordered structure from a protein population, optionally of mammalian origin, and a subsequent step of evaluating stability of a client protein in the presence of the one or more candidate proteins having the intrinsically disordered structure, and a step of determining that the candidate protein is a client-protein protecting protein when a degree of stability of the client protein in the presence of the candidate protein is above the degree of stability in the absence of the candidate protein or the degree of stability in the presence of a control protein.

2. The method according to claim 1, wherein, in the evaluation step, the stability of the client protein is evaluated based on a degree of protection of the client protein from stress, and wherein the stress is optionally one or more selected from the group consisting of physical stresses and chemical stresses.

3. The method according to claim 1, wherein the client protein is a physiologically active protein optionally selected from the group consisting of antibodies, antibody fragments, enzymes, hormones, cytokines and interferons and wherein the physiologically active protein is optionally an active ingredient of a medicine.

4. The method according to claim 3, which is a method for identifying a protein useful for stabilization of the physiologically active protein.

5. The method according to claim 3, wherein the stability of the physiologically active protein is evaluated in accordance with conditions for a stability test required for approval for manufacture of the medicine.

6. The method according to claim 1, wherein the client protein is a non-aggregate protein.

7. The method according to claim 1, wherein, in the evaluation step, the stability of the client protein is evaluated using a degree of aggregation of the protein as an index, wherein the aggregation of the protein is optionally measured by one or more selected from the group consisting of a filter trap assay or protein localization in a cell, pulse shape analysis (PulSA), phenotype analysis, detection using a protein aggregation detecting dye (thioflavin T (ThT)), and detection using a protein aggregation detecting reagent (ProteoStat), wherein the client protein is optionally an aggregate protein, and wherein the aggregate protein is optionally a protein causing development and/or progression of a disease.

8. The method according to claim 7, which is a method for screening for a protein effective in treatment, prevention or improvement of the disease, optionally a disease which develops and/or progresses upon abnormal aggregation of the protein, wherein the disease which develops and/or progresses upon abnormal aggregation of the protein is optionally a neurodegenerative disease.

9. The method according to claim 1, wherein the candidate protein is of mammalian origin and wherein the candidate protein is optionally a protein which remains heat-soluble after a heat treatment.

10. The method according to claim 1, wherein the candidate protein is a protein in which a median of IUPred scores of all amino acid residues is greater than 0.5, and wherein the candidate protein is optionally a protein in which more than 50% of amino acid residues relative to the entire sequence have an IUPred score of greater than 0.3.

11. The method according to claim 1, wherein, in the selection step, the intrinsically disordered structure of the protein is evaluated by an intrinsically disordered region prediction method, and wherein the intrinsically disordered region prediction method is optionally carried out using a program selected from the group consisting of IUPred, D2P2, GlobPlot, GLOBPLOT2, FoldIndex, IsUnstruct, PONDR VL-XT, DisEMBL, PONDR VL3, PONDR VL3H, RONN, PONDR VSL2B, PONDR VSL2P, Spritz, and SLIDER.

12. The method according to claim 11, wherein, in the selection step, the intrinsically disordered structure of the protein is evaluated by IUPred and wherein a protein of interest in which a median of IUPred scores of all amino acid residues is greater than 0.5 in IUPred is optionally selected as the candidate protein.

13. The method according to claim 11, wherein, in the selection step, the intrinsically disordered structure of the protein is evaluated by analysis based on heat solubility and wherein a protein which is heat-soluble after a heat treatment is optionally selected as the candidate protein.

14. The method of claim 1, wherein the candidate protein is determined to be a client protein protecting protein when the candidate protein protects the client protein from denaturation.

* * * * *